United States Patent [19]
Kodera et al.

[11] Patent Number: 5,786,879
[45] Date of Patent: Jul. 28, 1998

[54] LIQUID CRYSTAL DEVICE WITH DIFFERENT PRETILT IN PERIPHERAL PORTION

[75] Inventors: Yasuto Kodera, Fujisawa; Yoshio Hotta; Yukio Hanyu, both of Atsugi; Tadashi Mihara, Isehara; Sunao Mori, Atsugi, all of Japan

[73] Assignee: Canon Kabushiki Kaisha, Tokyo, Japan

[21] Appl. No.: 740,485

[22] Filed: Oct. 30, 1996

Related U.S. Application Data

[62] Division of Ser. No. 512,349, Aug. 8, 1995, abandoned, which is a continuation of Ser. No. 234,992, Apr. 28, 1994, abandoned.

[30] Foreign Application Priority Data

Apr. 28, 1993 [JP] Japan .................. 5-102754

[51] Int. Cl.⁶ .................. G02F 1/1333; G02F 1/13
[52] U.S. Cl. .................. 349/134; 349/172; 349/129
[58] Field of Search .................. 349/172, 184, 349/174, 134, 129

[56] References Cited

U.S. PATENT DOCUMENTS

| | | | |
|---|---|---|---|
| 5,013,137 | 5/1991 | Tsuboyama et al. | 350/333 |
| 5,182,662 | 1/1993 | Mihara | 359/63 |
| 5,204,706 | 4/1993 | Saito | 352/129 |
| 5,204,766 | 4/1993 | Taniguchi et al. | 359/81 |
| 5,276,542 | 1/1994 | Iwayama et al. | 359/86 |
| 5,293,534 | 3/1994 | Mihara | 359/84 |
| 5,381,256 | 1/1995 | Hanyu et al. | 359/79 |
| 5,437,812 | 8/1995 | Janulis et al. | 349/184 |
| 5,454,976 | 10/1995 | Yagi et al. | 252/299.61 |

FOREIGN PATENT DOCUMENTS

| | | |
|---|---|---|
| 0525673 | 2/1993 | European Pat. Off. |
| 0550846 | 7/1993 | European Pat. Off. |
| 62-203128 | 9/1987 | Japan . |
| 4-258924 | 9/1992 | Japan . |
| 5-188348 | 7/1993 | Japan . |

OTHER PUBLICATIONS

Patent Abstracts of Japan, vol. 16, No. 330 (Jul. 1992) (P–1388).
Patent Abstracts of Japan, vol. 16, No. 511 (Oct. 1992) (P–1441).

*Primary Examiner*—William L. Sikes
*Assistant Examiner*—Kenneth Parker
*Attorney, Agent, or Firm*—Fitzpatrick, Cella, Harper & Scinto

[57] ABSTRACT

A liquid crystal device is constituted by a pair of oppositely disposed substrates having opposing inner surfaces and opposing electrodes thereon, and a chiral smectic liquid crystal disposed between the opposing electrodes. The liquid crystal device has an effective optical modulation region and a peripheral region outside the effective optical modulation region. In the device, liquid crystal molecules in the peripheral region have a pretilt angle which is larger than a pretilt angle of liquid crystal molecules in the effective optical modulation region. As a result, a local pressure irregularity or a cell thickness change caused by a liquid crystal molecular movement along an extension of the device is effectively suppressed.

15 Claims, 15 Drawing Sheets

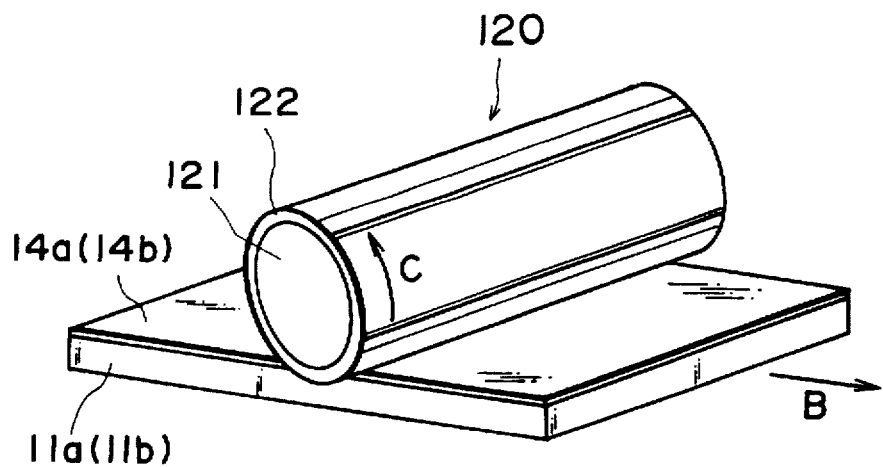
F I G. 7A
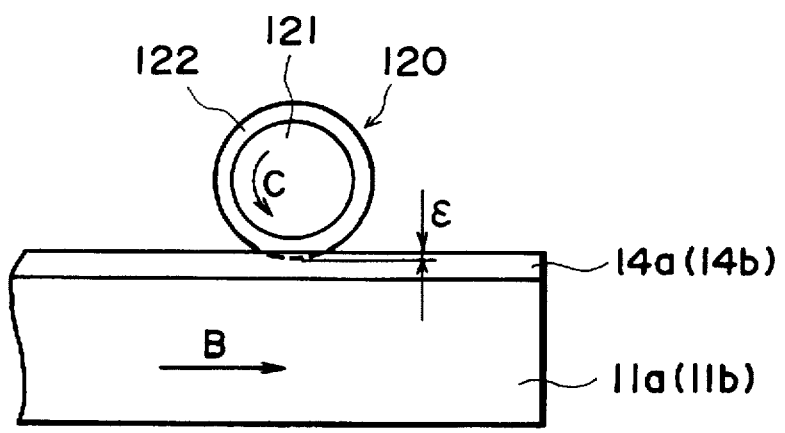
F I G. 7B

LIQUID CRYSTAL DEVICE WITH DIFFERENT PRETILT IN PERIPHERAL PORTION

This application is a division of application Ser. No. 08/512,349, filed Aug. 8, 1995, now abandoned, which is a continuation of application Ser. No. 08/234,992, filed Apr. 28, 1994, now abandoned.

FIELD OF THE INVENTION AND RELATED ART

The present invention relates to a liquid crystal device which may be used as a display device for a television receiver, a view finder for a video camera or a terminal monitor for a computer, or a light valve (optical shutter) for a liquid crystal printer, a projector, etc.

A liquid crystal display device of a passive matrix drive-type using a TN (twisted nematic) liquid crystal has been known as a device which can be produced at a relatively low cost. The passive matrix-drive type liquid crystal device using a TN-liquid crystal has a certain limitation due to the occurrence of a crosstalk or a lowering in contrast along with the increase in number of drive lines so that it cannot be said to be suitable as a display device requiring a high resolution and a large number of drive lines, e.g., a liquid crystal television panel.

As a type of liquid crystal device having solved such a fundamental problem of a conventional TN-liquid crystal device, there has been known a ferroelectric liquid crystal device having bistability. In the ferroelectric liquid crystal device, a liquid crystal showing a chiral smectic phase, such as chiral smectic C (SmC*) phase or chiral smectic H (SmH*) phase, in its operational state is used. The liquid crystal tends to assume one of two bistable states and does not readily assume an intermediate molecular position. Further, this type of liquid crystal quickly assumes one of the two stable states in response to an electric field applied thereto and retains the resultant state in the absence of an electric field. By utilizing a chiral smectic liquid crystal showing such properties to constitute a liquid crystal device, it has become possible to provide substantial improvements to the problems of a conventional TN-liquid crystal device, inclusive of a poor viewing angle characteristic.

In this type of chiral smectic liquid crystal device, however, there has been found a problem that liquid crystal molecules can move in a direction parallel to the substrate extension in some cases under application of an electric field. As a result of the movement, there is caused a phenomenon that the cell thickness (spacing between a pair of substrates sandwiching a liquid crystal material) is changed to provide a pale yellow tint on a display picture (which phenomenon may be referred to as "yellowing"). The phenomenon is not desirable not only for a display device but also for any other optical modulation device as it causes a deterioration in optical performance.

In order to suppress such a liquid crystal molecular movement, there has been proposed a technique of roughening the inner surface of a substrate in EP-A 0550846 (corresponding to U.S. patent application Ser. No. 07/988,830, filed Dec. 10, 1992).

The above-mentioned inner surface roughening technique has not been always satisfactory. This is because the inner surface roughening as a technique of physically or dynamically suppressing the liquid crystal molecular movement is not always preferred, since, for example, some liquid crystal can provide a better alignment quality if the inner surface is free from roughening.

Further, while the surface roughening is effective for suppressing the yellowing on a display of an ordinary display as used in character compilation, the yellowing can be still liable to be caused on a display of a certain special graphic display pattern.

SUMMARY OF THE INVENTION

In view of the above-mentioned problems of the prior art, an object of the present invention is to provide a liquid crystal device having a simple structure, in which a cell thickness change hardly occurs, and also an apparatus using the liquid crystal device.

Another object of the present invention is to provide a liquid crystal device wherein a substantial cell thickness change hardly occurs even if a liquid crystal molecular movement occurs, and also an apparatus using the liquid crystal device.

Another object of the present invention is to provide a liquid crystal device excellent in wide applicability, wherein a cell thickness change hardly occurs even if any liquid crystal material is used therein and any drive method is applied thereto, and also an apparatus using the liquid crystal device.

A further object of the present invention is to provide a liquid crystal device with excellent reliability and free from deterioration in optical characteristic.

According to an aspect of the present invention, there is provided a liquid crystal device comprising a pair of oppositely disposed substrates having opposing inner surfaces and opposing electrodes thereon, and a chiral smectic liquid crystal disposed between the opposing electrodes, said liquid crystal device having an effective optical modulation region and a peripheral region outside the effective optical modulation region; wherein liquid crystal molecules in the peripheral region have a pretilt angle which is larger than a pretilt angle of liquid crystal molecules in the effective optical modulation region.

The following features may preferably be added by selection in order to enhance the effect of the present invention. Thus, it is preferred to roughen the inner surface of at least one of the pair of substrates.

It is also preferred that the liquid crystal molecules in the effective optical modulation region have a high pretilt angle of at least 10 degrees or a low pretilt angle of at least 5 degrees.

It is preferred that the peripheral region is divided into a first region adjacent to the effective optical modulation region and a second region outside the first region, so that the liquid crystal molecules in the first region have a pretilt angle substantially equal to that in the effective optical modulation region, and the liquid crystal molecules in the second region have a pretilt angle larger than that in the effective optical modulation region.

It is preferred that a plurality of adhesive particles and a plurality of spacers are disposed between the substrates.

It is also preferred that the opposing electrodes are supplied with a drive signal comprising bipolar pulses, with respect to a reference potential, for driving.

It is also preferred that the peripheral region is optically covered with a masking member.

As a result of our study, it has been found that the density irregularity of liquid crystal molecules leading to a cell thickness change in the effective optical modulation region can be relaxed by placing the liquid crystal molecules in the peripheral region outside the effective optical modulation region in a high pretilt state so as to increase the mobility of the liquid crystal molecules in the peripheral region. It has been also found possible to cause some liquid crystal molecules to move from the peripheral region to a low-density portion.

In this way, in contrast to a conventional technique of only intending to suppress the liquid crystal molecular movement, it is intended to positively utilize the movement of liquid crystal molecules to prevent a cell thickness change, thus preventing the occurrence of yellowing, in the present invention.

As a result, according to the present invention, the yellowing due to a cell thickness change hardly occurs, even if the liquid crystal material or a drive scheme which has been liable to cause a cell thickness change is used or even if a display pattern which has been liable to cause a cell thickness change is displayed.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 7A and 7B are schematic illustrations of a rubbing method.

DESCRIPTION OF THE PREFERRED EMBODIMENTS

The liquid crystal device according to the present invention is basically applicable to any type of optical modulation but may preferably be applied to a type of optical modulation as used in an optical shutter or a light valve capable of controlling the light transmittance through each pixel at binary levels or multiple levels. The pixel addressing scheme may be one of a multiplex scheme using an electrode matrix or a photo-address scheme using a photoconductor film.

Figure 1A:
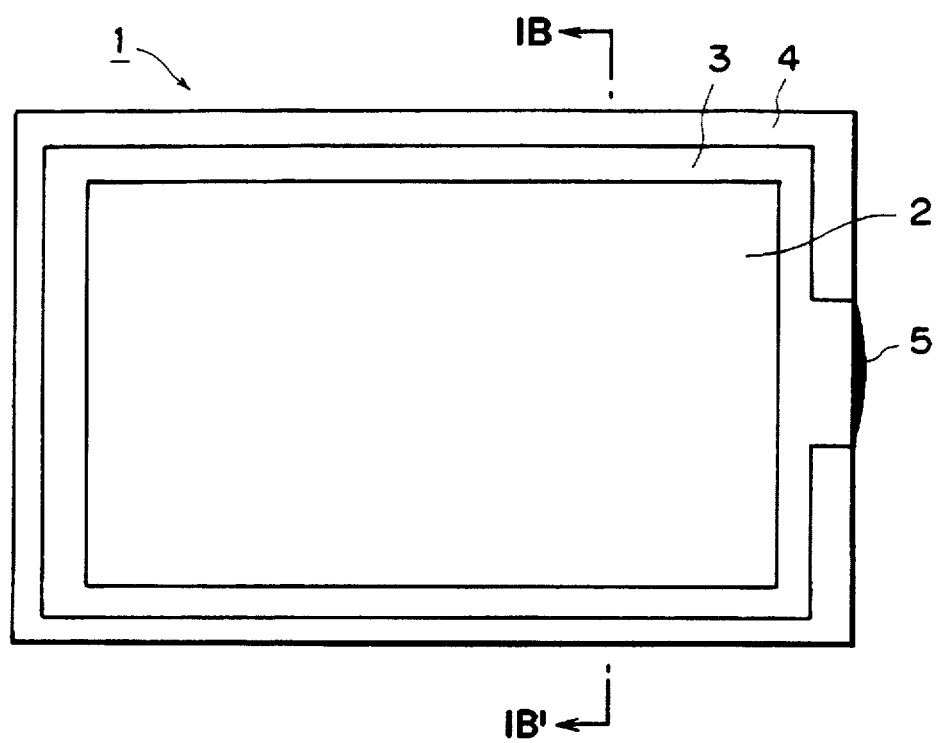
FIG. 1A is a schematic plan view of a preferred embodiment of the liquid crystal device according to invention.
Figure 1B:
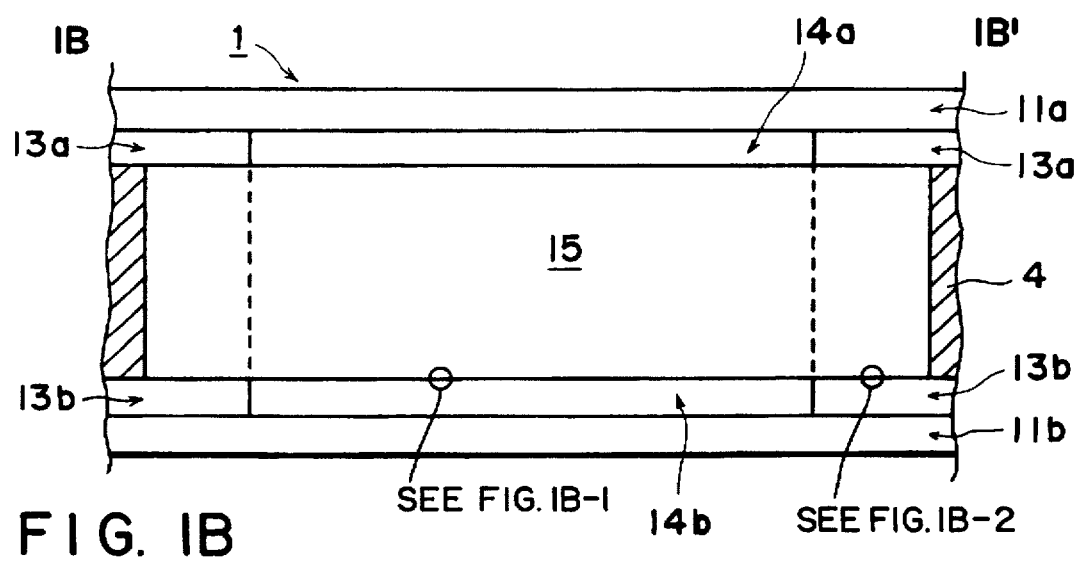
FIG. 1B is a schematic sectional view taken along a line 1B-1B' in FIG. 1A.
Figures 1, 1B:
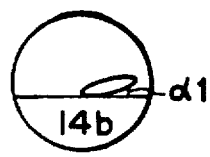
Figures 1, 1B, 2:

FIG. 1A is a schematic plan view of a preferred embodiment of the liquid crystal device according to the present invention, and FIG. 1B is a schematic sectional view taken along an 1B-1B' line as view in the direction of arrows in FIG. 1A.

Referring to FIG. 1A, a liquid crystal device (cell or panel) 1 schematically has a planar shape as shown, including an effective optical modulation region 2, a peripheral region 3 adjacent to and outside the region 2, and a sealing part 4 surrounding the peripheral region 3 except for an injection port 5, which is sealed with a sealing member after the liquid crystal injection.

Referring to FIG. 1B, the liquid crystal device includes a pair of an upper substrate 11a and a lower substrate 11b, each having electrodes (not shown) thereon. The substrates 11a and 11b are provided with peripheral alignment control regions 13a and 13b, respectively, for providing a high pretilt angle $\alpha_2$ to the liquid crystal in the peripheral region 3, and alignment control regions 14a and 14b, respectively, for providing a low pretilt angle $\alpha_1$ to the liquid crystal in the effective optical modulation region, satisfying $\alpha_1 < \alpha_2$. Between the substrates 11a and 11b is disposed a liquid crystal material 15 which is capable of showing a chiral smectic phase and can cause liquid crystal molecular movement when driven under application of an electric field in a conventional liquid crystal cell structure.

Herein, the effective optical modulation region refers to a display region including a large number of pixels to effect a display by controlling the transmittance through the respective pixels in the case of a display device, and to a region of effecting optical modulation depending on drive signals in the case of a non-display device, such as a light valve.

Figure 2A:
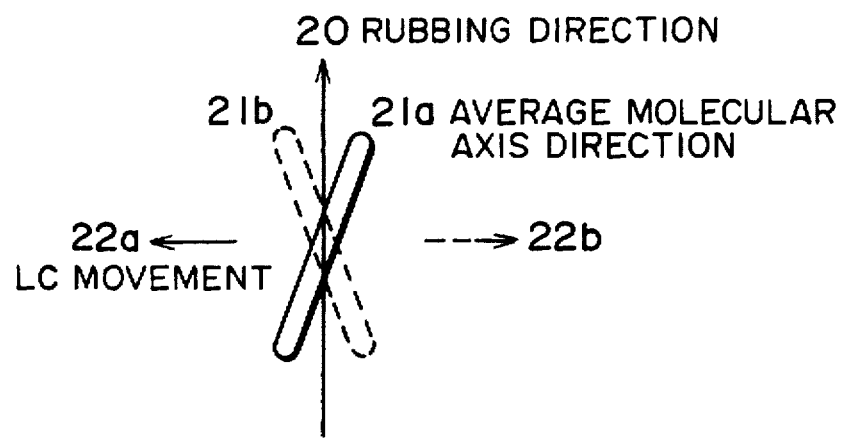
FIGS. 2A and 2B are explanatory views for illustrating a liquid crystal molecular movement in a liquid crystal device.
Figure 2B:
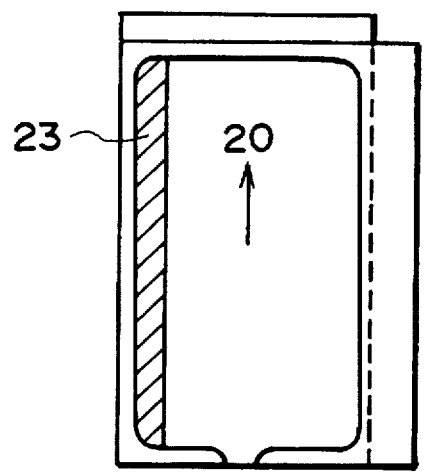

According to our study, the increase in cell thickness is recognized to be caused by a pressure increase, which in turn is caused by movement of liquid crystal molecules in a particular direction due to driving, particularly at a cell side. Presumably, such a force causing the liquid crystal molecule movement may be attributable to an electrodynamic effect caused by perturbation of liquid crystal molecule dipole moments in an AC-like electric field caused by continuation of drive pulses. Further, according to our experiments, the directions 22a and 22b of the liquid crystal movement are determined in relation with the rubbing direction 20 and the average liquid crystal molecular axis position 21a or 21b as shown in FIG. 2A. As the moving direction of liquid crystal molecules is related with the rubbing direction, the above-mentioned phenomenon is assumed to depend on the pre-tilt state at the substrate surfaces. Referring to FIGS. 2A and 2B, reference numeral 21a (or 21b in a reverse orientation state) denotes an average molecular axis (director) orientation. When the liquid crystal molecules (described herein as having a negative spontaneous polarization) are oriented to provide the average molecular axis 21a and are supplied with a certain strength of AC electric field not causing a switching to the orientation state 21b, the liquid crystal molecules are liable to move in the direction of an arrow 22a in the case where the substrates are provided with rubbing axes extending in parallel and in the same direction 20. This liquid crystal movement phenomenon depends on an alignment state in the cell.

In an actual liquid crystal cell, the liquid crystal movement occurs as shown in FIG. 2A. For example, when the liquid crystal molecules in the entire cell are placed in a state providing an average molecular axis direction 21a, the liquid crystal molecules in the cell are liable to move under AC application in the direction of the arrow 22a, i.e., from the right to the left in the figure. As a result, the cell thickness in a region 23 is increased gradually to show a yellowish tint. If the liquid crystal molecules are placed in a state providing an average molecular axis 21b, the liquid crystal movement under AC application is caused in the reverse direction 22b. In either case, the liquid crystal movement is liable to be caused in a direction perpendicular to the rubbing direction, i.e., in the direction of extension of smectic layers. It has been also observed that a cell thickness increase is also caused in a direction of a normal to smectic layers in addition to the direction of smectic layers as mentioned above.

Figure 3A:
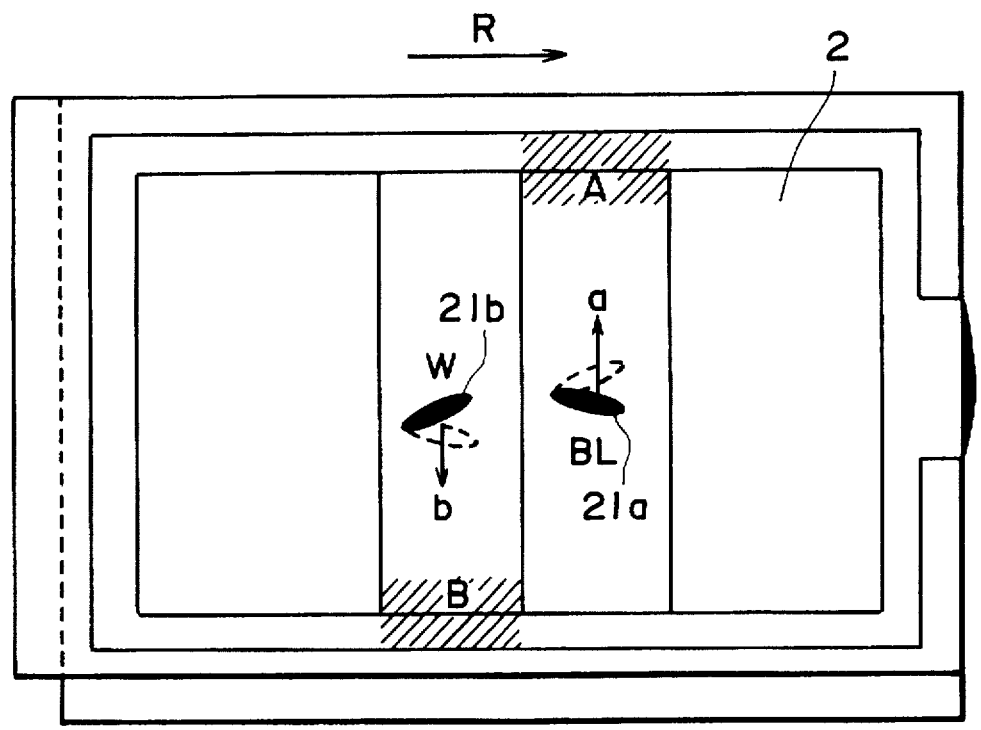
FIGS. 3A and 3B are explanatory views for illustrating a liquid crystal molecular movement in an embodiment of the liquid crystal device according to the invention.

According to another experiment, when a black (BL)-and-white (W) stripe pattern is continually displayed on a display panel formed by rubbing in a direction R as shown in FIG. 3A, liquid crystal molecules in a region of displaying "black" (BL or dark) placed in an average molecular axis direction 21a are moved in the direction of an arrow a to provide a panel side region A which shows a larger cell thickness than the surrounding region. On the other hand, liquid crystal molecules placed in an average molecular axis direction 21b in a region of displaying "white" (W or bright) are moved in the direction of an arrow b to provide a panel side region B having an increased cell thickness on the opposite side.

In contrast thereto, it has been found that, in case where a peripheral region 3 is disposed to surround a display region 2 (as an effective optical modulation region) and a high pretilt alignment state is established in the peripheral region, the liquid crystal molecules in the black-displaying state moving in the direction a can further move to the peripheral region 3 and the liquid crystal molecules collected in the peripheral region can further move in directions c and d. Reversely, liquid crystal molecules can also move in a direction e.

On the other hand, in the white-display region, accompanying the liquid crystal movement in the direction b, liquid crystal molecules collected in the peripheral region can move in directions cc and dd and also in a direction ee.

The above phenomenon is caused presumably because as liquid crystal molecules are aligned with a higher pretilt angle, i.e., closed to a homeotropic alignment, smectic layers formed along panel surfaces approach an isotropic state, so that liquid crystal molecules are caused to move in an isotropic manner in response to an external electric field applied thereto.

Figure 3B:
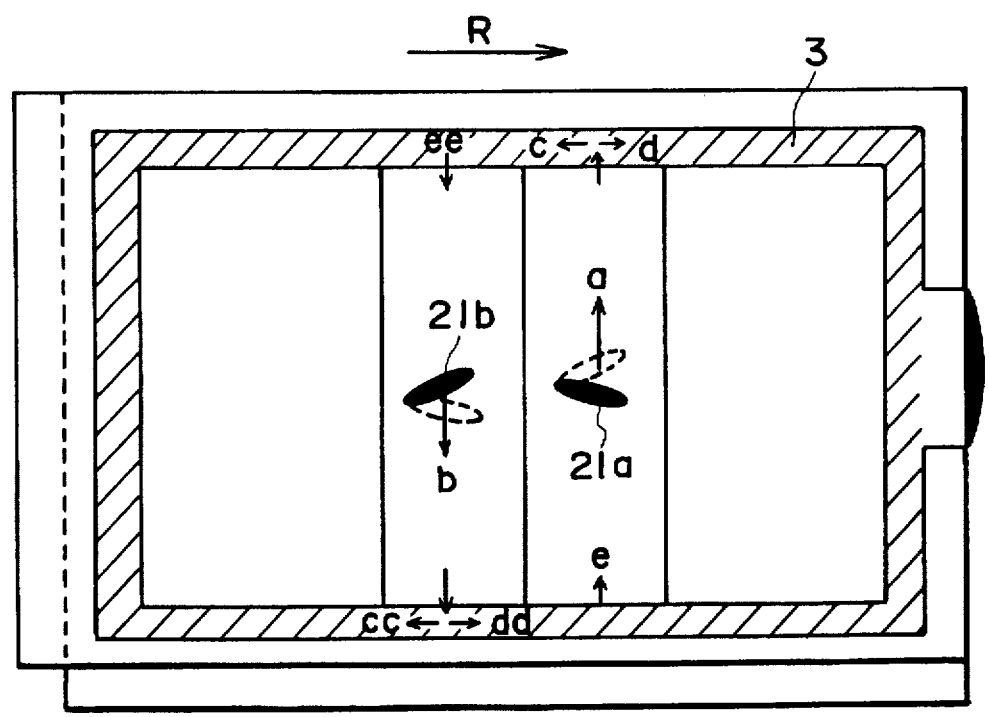

As a result, in a liquid crystal panel according to the present invention, even if a pressure distribution is developed as a result of liquid crystal molecular movement as shown in FIG. 3A, the pressure distribution is relaxed by the isotropic movement of liquid crystal molecules in the peripheral region as shown in FIG. 3B, thereby suppressing the cell thickness increase along a panel side.

While FIG. 3B shows a most preferred embodiment wherein the peripheral region is disposed along the entire periphery of a panel, this is not essential, so that the peripheral region can be disposed, e.g., only the upper and lower sides of the panel shown in FIG. 3B.

In further preferred embodiments, the following features may preferably be adopted by selection.

It is preferred that at least one of the substrates constituting the liquid crystal device according to the present invention is roughened with respect to the inner surface thereof. This is because, if the liquid crystal molecular movement in the effective optical modulation region is suppressed to some extent by a roughened inner surface, it is possible to optimize the liquid crystal injection from the peripheral region and the release of the liquid crystal to the peripheral region in good balance with the movement in the effective optical modulation region. The roughened surface prepared for this purpose may be either a regular or an irregular one.

There are two effective design concepts regarding the pretilt angle in the effective optical modulation region. According to one thereof, an aligning treatment is effected so as to provide a pretilt angle in the range of 10–25 degrees. According to the other one, the pretilt angle is suppressed to at most 5 degrees. The former design is effective for readily providing a chevron structure wherein smectic layers are bent between the substrates, e.g., by providing axes of uniaxial alignment as by rubbing or oblique evaporation which are in mutually parallel and substantially identical directions to a pair of substrates constituting the liquid crystal device. A resultant high-pretilt chevron structure is advantageous in that an alignment disorder is not readily caused even in contact with a roughened inner surface. The latter design is effective for readily providing a bookshelf structure wherein smectic layers are free from bending between the substrates, e.g., by providing uniaxial alignment aces which are in mutually parallel and opposite directions to a pair of substrates or by providing a uniaxial alignment axis to only one of a pair of substrates. In a resultant low-pretilt bookshelf structure, the liquid crystal molecular movement velocity is relatively small even without roughening of the inner surfaces, so that a good balance with the moving speed to and from the peripheral region can be easily accomplished. The low-pretilt bookshelf structure may provide a better alignment state in respect of optical characteristic.

The peripheral region according to the present invention need not be disposed so as to surround the entirety of the effective optical modulation region. It is sufficient to dispose such a peripheral region on both lateral sides or on both longitudinal sides, preferably in a direction of smectic layer extension. The peripheral region may preferably have a width which is larger than that of one pixel. It is preferred to optically mask the peripheral region by a masking member or a light-interrupting member so as to substantially not effecting an optical modulation. It is theoretically sufficient that the peripheral region has a large pretilt angle than that in the effective optical modulation region even if the difference is small since a larger mobility can be realized in the peripheral region than in the effective optical modulation region. Actually, however, it is preferred to have a difference in pretilt angle of at least 10 degrees. In order to facilitate the cell production, a substantially homeotropic alignment is desirable.

The peripheral region can partially include a sub-region wherein the pretilt angle is similar to that in the effective optical modulation region. The sub-region may preferably be disposed adjacent to the effective optical modulation region.

It is possible to dispose electrodes in the peripheral region similarly as in the effective optical modulation region so as to promote the liquid crystal molecular movement by selectively applying an electric field. The electric field may preferably be given by drive signals identical to those of scanning signals and/or data signals for driving the liquid crystal at the pixels in the effective optical modulation region.

In the preparation of a cell, it is preferred to disperse spacer beads and adhesive beads between the substrates so as to suppress the liquid crystal molecular movement in the effective optical modulation region.

Next, microscopic structures of a smectic liquid crystal used in the present invention will be described.

Figure 4:
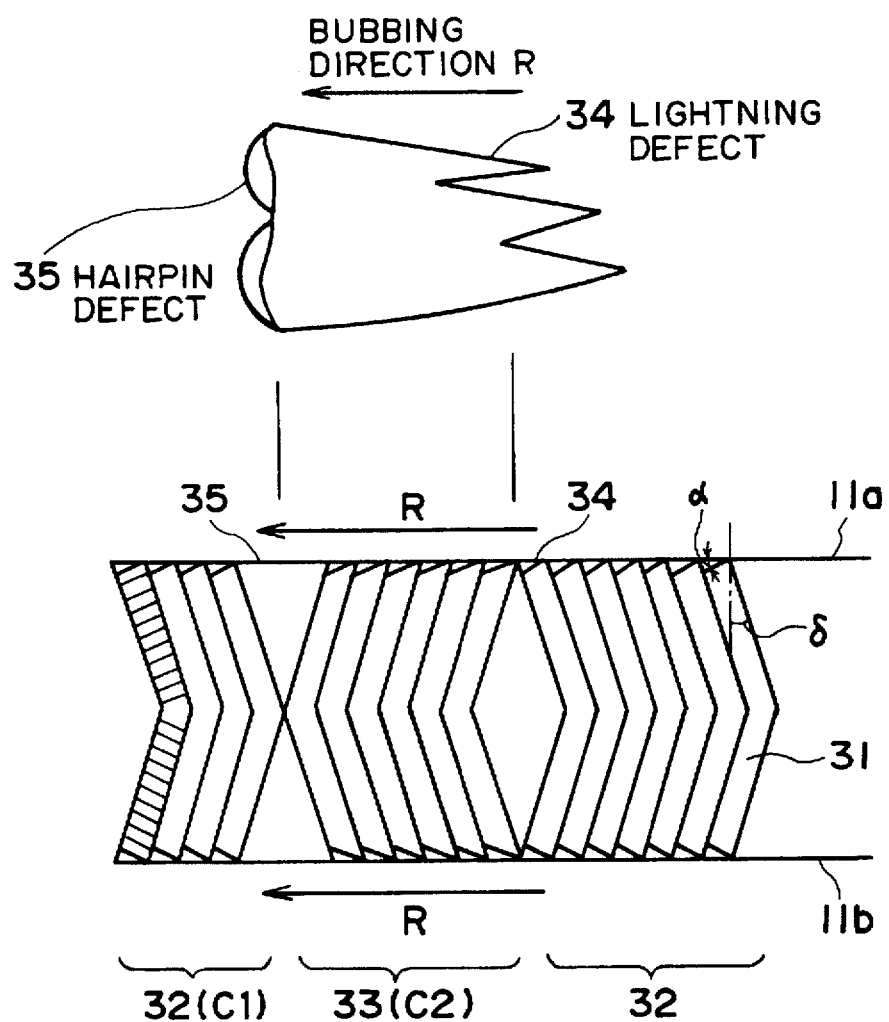
FIG. 4 is an explanatory view for illustrating an alignment state occurring in a chiral smectic liquid crystal used in the invention.

The alignment state in smectic phase including a chevron structure may be described as including two alignment states of C1 and C2 as shown in FIG. 4. Referring to FIG. 4, reference numeral 31 denotes a smectic layer, 32 denotes a C1 alignment region, and 33 denotes a C2 alignment region. A smectic liquid crystal generally has a layer structure and causes a shrinkage of layer pitch when it is transformed from SmA (smectic A) phase into SmC (smectic C) phase or SmC* (chiral smectic C) phase, to result in a structure accompanied with a bending of layers between the upper and lower substrates 14a and 14b (chevron structure) as shown in FIG. 4. The bending of the layers 31 can be caused in two ways corresponding to the C1 and C2 alignment as shown. As is well known, liquid crystal molecules at the substrate surfaces are aligned to form a certain angle $\alpha$ (pre-tilt) as a result of rubbing in a direction A in such a manner that their heads (leading ends) in the rubbing direction are up (or away) from the substrate surfaces 11a and 11b. Because of the pre-tilt, the C1 and C2 alignment states are not equivalent to each other with respect to their elastic energy, and a transition between these states can be caused at a certain temperature or when supplied with a mechanical stress. When the layer structure shown in FIG. 4 is viewed in plan as shown in the upper part of FIG. 4, a boundary 34 of transition from C1 alignment (32) to C2 alignment (33) in the rubbing direction A looks like a zigzag lightning and is called a lightning defect, and a boundary 35 of transition from C2 alignment (33) to C1 alignment (32) forms a broad and moderate curve and is called a hairpin defect.

When a chiral smectic liquid crystal is disposed between a pair of substrates 11a and 11b provided with uniaxial alignment axes which are substantially parallel to each other and identical in direction as by a uniaxial aligning treatment, such as rubbing, and the liquid crystal is placed in an alignment state satisfying a relationship of $\widehat{H}<\alpha+\delta$... (1), wherein $\alpha$ denotes a pretilt angle of the liquid crystal, $\widehat{H}$ denotes a tilt angle (a half of cone angle), and $\delta$ denotes an angle of inclination of SmC* layer, there are four states each having a chevron structure in the C1 alignment state. These four C1 alignment states are different from the known C1 alignment state. Further, two among the four C1 alignment states form bistable states (uniform alignment). Herein, two states among the four C1 states giving an apparent tilt angle $\theta_a$ therebetween in the absence of an electric field satisfying a relationship of $\widehat{H}>\theta_a>\widehat{H}/2$ ... (2) are inclusively referred to as a uniform state.

Figure 5B:
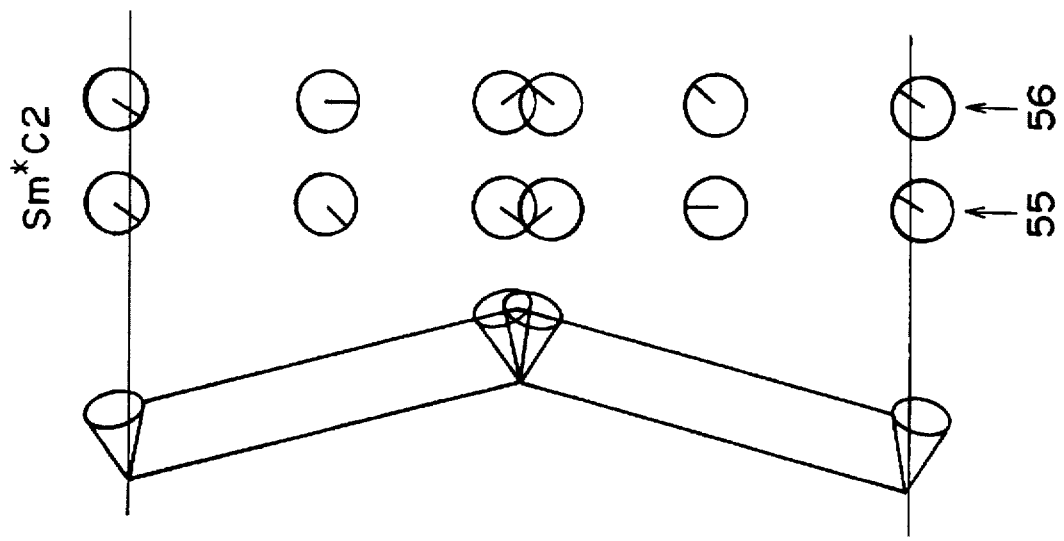
FIGS. 5A and 5B are explanatory views for illustrating changes in director orientation according to various positions between substrates in C1 alignment and C2 alignment, respectively, in a chevron structure of a smectic liquid crystal.
Figure 5A:
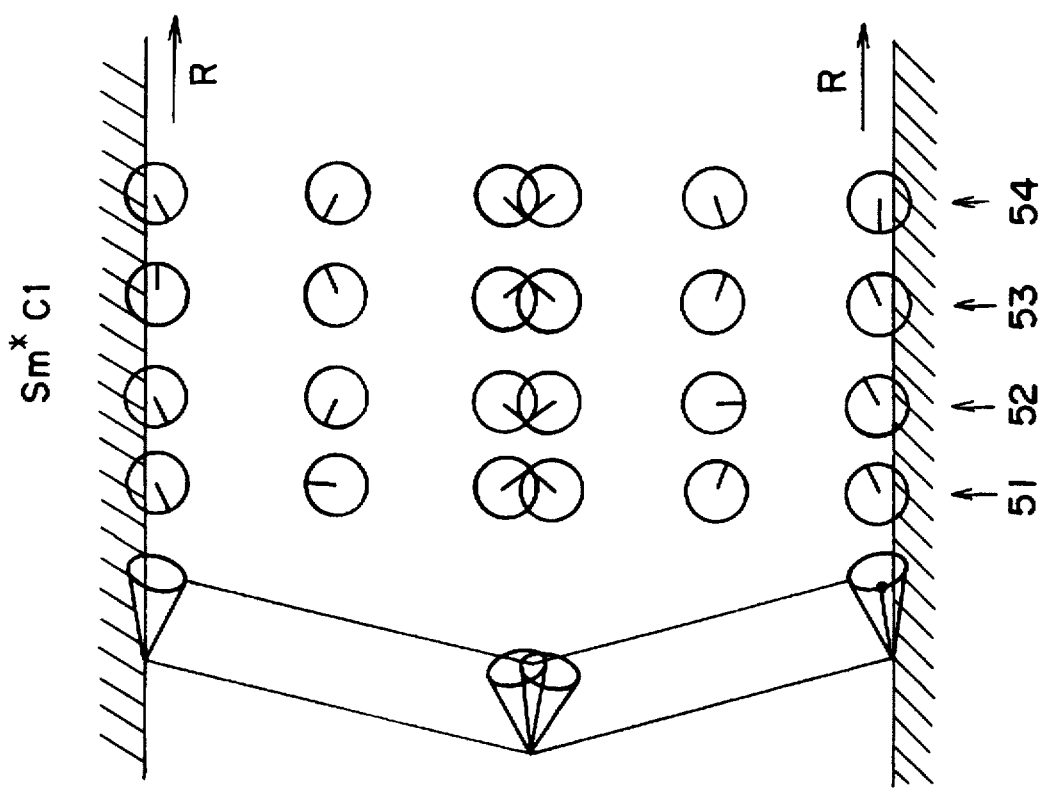

In the uniform state, the directors are believed to be not twisted between the substrates in view of optical properties thereof. FIG. 5A is a schematic view illustrating director positions between the substrates in the respective states in C1 alignment. More specifically, at 51–54 are respectively shown changes in director positions between the substrates in the form of projections of directors onto cone bottoms as viewed from each bottom. At 51 and 52 is shown a splay state, and at 53 and 54 is shown a director arrangement which is believed to represent a uniform alignment state. As is understood from FIG. 5A, at 53 and 54 representing a uniform state, the molecule position (director) is different from that in the splay state either at the upper substrate or lower substrate. FIG. 5B shows two states 55 and 56 in C2 alignment between which no switching is observed at the boundaries but an internal switching is observed. The uniform states 53 and 54 in C1 alignment provide a larger tilt angle $\theta_a$ and thus a higher brightness and a higher contrast than the conventionally used bistable state in C2 alignment.

Figure 6A:
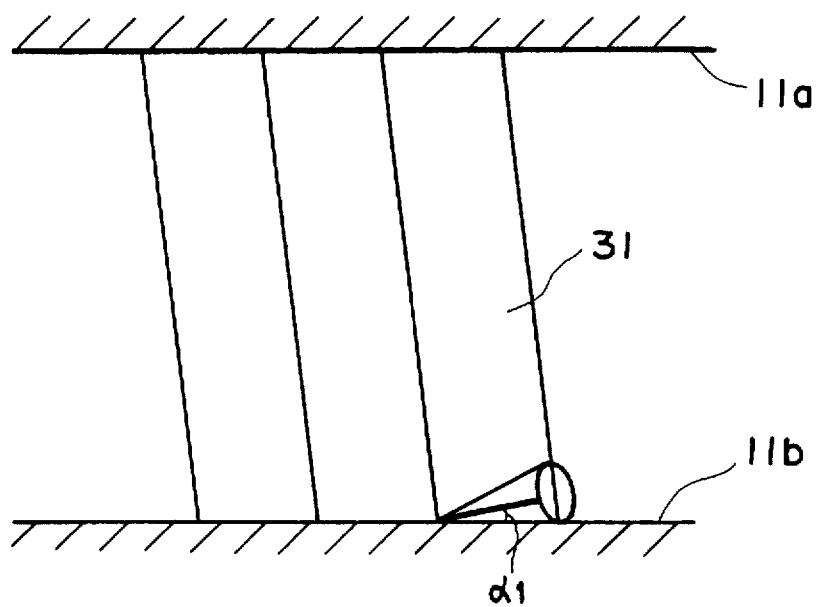
FIGS. 6A and 6B are schematic illustration of a bookshelf structure of a smectic liquid crystal.
Figure 6B:
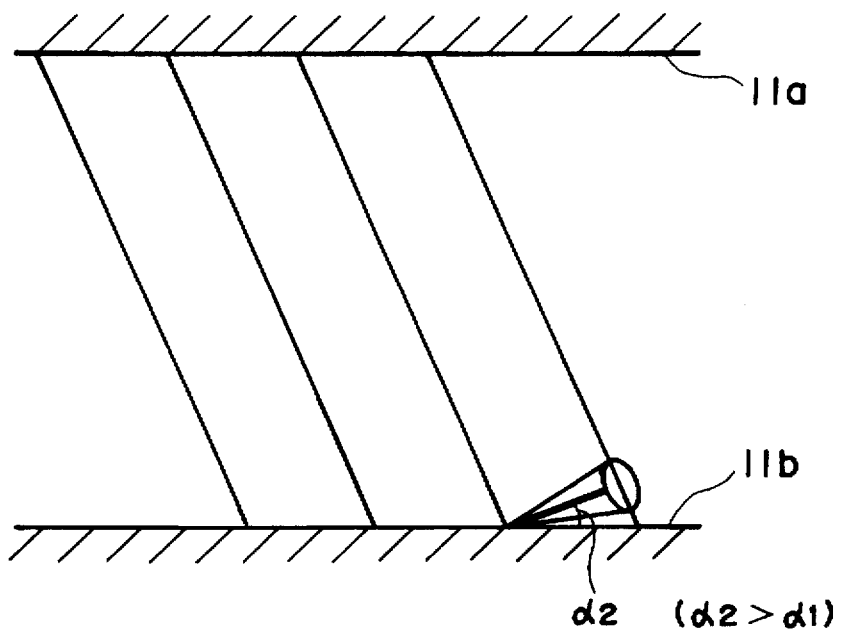

In contrast thereto, FIGS. 6A and 6B schematically show smectic layer structures of a bookshelf structure, including an oblique bookshelf structure of a low pretilt angle ($\alpha_1$) shown in FIG. 6A and an oblique bookshelf structure of a high pretilt angle ($\alpha_2>\alpha_1$) shown in FIG. 6B.

In the present invention, it is preferred to use a high-pretilt chevron structure in C1 alignment having a pretilt angle of at least 10 degrees, more preferably 10–25 degrees, or a low-pretilt bookshelf structure having a pretilt angle of at most 10 degrees, more preferably at most 5 degrees.

[Cell Structure]

The liquid crystal cell (device) according to the present invention may be composed of a pair of substrates which may be of any materials as far as at least one thereof is transparent. Examples of the transparent substrate material may include glass, quartz and plastic sheets. On the other hand, a substrate not requiring optical transparency can be of any materials inclusive of metals, semiconductors and insulating materials as far as it provides an appropriate substrate surface.

At least one of the opposing electrodes respectively formed on the pair of substrates may desirably be composed of a transparent conductor, suitable examples of which may include: tin oxide, indium oxide and indium tin oxide (ITO). According to necessity, a transparent electrode may be supplemented with a low-resistivity metal electrode disposed along a side thereof. The electrode may preferably have a thickness of 40–200 nm.

The substrates may be coated with an alignment film, examples of which may include: films of organic materials, such as polyimide, polypyrrole, polyvinyl alcohol, polyamideimide, polyesterimide, polyparaxylylene, polyester, polycarbonate, polyvinyl acetal, polyvinyl chloride, polyamide, polystyrene, polyaniline, cellulosic resin, acrylic resin and melamine resin; and inorganic films, such as obliquely evaporated film of SiO. The alignment film may preferably have a thickness on the order of 5–100 nm. A desired pretilt angle may be provided by an appropriate combination of a liquid crystal material and an alignment film, but it is preferred to obtain a desired pretilt angle by appropriately selecting the degree of rubbing (e.g., rubbing intensity, number of rubbing treatments, etc.).

In the present invention, it is also possible to dispose an insulating film below the alignment film. The insulating film may preferably comprise an inorganic material such as $TixSiyOz$ (x+y+z =1), $SiO_2$, TiO or $Ta_2O_5$. In case of roughening the inner surface of a substrate, it is preferred to disperse fine particles of, e.g. oxides, such as $SiO_2$, $Al_2O_3$, etc., in the insulating film.

An insulating film for providing a roughened inner surface may for example be prepared by applying a solution or dispersion of an inorganic film precursor (e.g., one containing Ti and Si in a ratio of 1:10–10:1, preferably around 1:1) containing fine particles dispersed therein on a substrate, followed by baking. The degree of unevenness may be controlled by changing the dispersion density and the average particle size of the fine particles and the thickness of the insulating film covering the fine particles. The fine particles for providing a roughened inner surface may preferably have a particle size of about 1–100 nm. The insulating film retaining the fine particles therein may preferably have a thickness of about 20–30 nm.

A high-pretilt alignment, preferably a homeotropic alignment, may be formed in the peripheral region by disposing on the substrate in the region either one or both of the insulating film and the alignment film, but not subjecting these films to uniaxial aligning treatment such as rubbing.

The direction of the uniaxial alignment axis as by rubbing may be disposed so that both sides in a direction intersecting the alignment axis are provided with the peripheral regions, whereby liquid crystal molecules moved in a smectic layer reach one of the high-pretilt peripheral regions which are disposed on both ends of the smectic layer.

(Preparation of liquid crystal cell)

A liquid crystal cell may for example be prepared in the following manner.

A pair of transparent substrates of, e.g., glass, may be provided. Each substrate is provided with a transparent conductor film by vapor deposition, such as CVD (chemical vapor deposition), sputtering, or ion plating, followed by patterning the conductor film into stripes through, e.g., photolithographic steps. The stripe electrodes may then be coated with an insulating film as by vapor deposition. For providing a roughened inner surface, an inorganic film precursor solution containing fine particles dispersed therein may be applied thereon, calcined and backed to form an insulating film providing a rough surface. Then, an alignment film may be formed, e.g., by application of a polyamide acid solution by spinner coating, followed by baking. The alignment film is then subjected to a rubbing treatment. On the substrate thus treated, spacer beads are dispersed and a peripheral sealing member is applied except for a part giving an injection port, and another substrate similarly treated is applied thereon together with additional dispersion of adhesive beads, if desired, to form a blank cell. The blank cell is then gradually filled with a liquid crystal material heated to a higher temperature phase and injected through an injection port and gradually cooled to cause a transition to chiral smectic phase.

The display region and the peripheral region providing different pretilt angles may be formed by forming a homeotropic alignment film onto an entire inner surface of a substrate and then selectively rubbing a part of the substrate giving the display region while masking a remaining part of the substrate giving the peripheral region, or by disposing a low-pretilt alignment film causing a low pretilt angle and a high-pretilt alignment film causing a high pretilt angle at the display region and the peripheral region, respectively, of the substrate.

In addition to the above-described method of applying an insulating film-precursor solution containing fine particles dispersed therein, the roughening of a substrate inner surface may be suitably performed by methods disclosed in EP-A 0550846 (U.S. Ser. No. 07/988,830).

Next, a preferred mode of rubbing will be described.

FIGS. 7A and 7B are a perspective view and a side view, respectively, schematically illustrating a manner of rubbing treatment. Referring to these figures, a rubbing apparatus (not entirely shown) includes a rubbing roller 120 which comprises a cylindrical roller 121 and a rubbing cloth 120, such as nylon yarn-planted cloth, wound about the roller 121. The rubbing roller 120 is rotated in a direction C and simultaneously caused to contact an alignment film 14a (or 14b) on a substrate 11a (or 11b) at a prescribed pressure while moving the glass substrate 11a (or 11b) in a direction B or moving the roller 120 in a counterdirection. As a result, the alignment film 14a (14b) is rubbed with the rubbing roller 120 to be imparted with an alignment control power. The alignment control power may primarily be controlled by a contact force acting between the rubbing roller 120 and the substrate 11a (or 11b) and ordinarily by moving the rubbing roller 120 up and down to change a pressing depth ε (FIG. 7B) of the rubbing cloth 122 against the alignment film 14a (14b). The alignment conditions including a setting of the pretilt angle may be controlled by changing a roller rotation speed, a roller feeding speed (relative to the substrate) and the number of rubbing operations in addition to the pressing depth ε.

Next, parameters indicating alignment characteristics of a liquid crystal cell referred to herein are based on values measured by methods described hereinbelow.

Measurement of true tilt angle θ

A sample liquid crystal cell is sandwiched between right angle-cross nicol polarizers and is supplied with bipolar pulses sufficiently larger than the threshold voltage of a pulse (e.g., AC pulses of 10 volts and 10 Hz in case where the threshold voltage comprises 10 volts and 50 μsec for a single pulse). Under the voltage application, the sample cell is rotated horizontally relative to the polarizers while measuring a transmittance through the cell to find a first extinct position (a position providing the lowest transmittance) and a second extinct position. A true tilt angle θ is measured as a half of the angle between the first and second extinct positions.

Measurement of apparent tilt angle θa

A sample liquid crystal cell sandwiched between right angle cross nicol polarizes was supplied with a single pulse of one polarity exceeding the threshold voltage of the cell and is then rotated under no electric field horizontally relative to the polarizers to find a first extinction position. Then, the cell is supplied with a single pulse of the opposite polarity exceeding the threshold voltage of the cell and is then rotated under no electric field relative to the polarizers to find a second extinct position. An apparent tilt angle θa is measured as a half of the angle between the first and second extinct positions.

Measurement of pretilt angle α

The measurement may be performed according to the crystal rotation method as described at Jpn. J. Appl. Phys. vol. 19 (1980), No. 10, Short Notes 2013.

More specifically, a pair of substrates rubbed in mutually parallel and opposite directions are applied to each other to form a cell having a cell gap of 20 μm, which is then filled with a liquid crystal mixture assuming SmA phase in the temperature range of 10°–55° C. obtained by mixing 80 wt. % of a ferroelectric liquid crystal ("CS-1014", mfd. by Chisso K.K.) with 20 wt. % of a compound represented by the following formula:

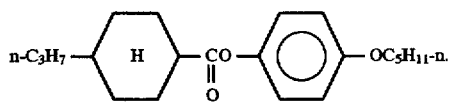

For measurement, the liquid crystal panel is rotated in a plane perpendicular to the pair of substrates and including the aligning treatment axis (rubbing axis) and, during the rotation, the panel is illuminated with a helium-neon laser beam having a polarization plane forming an angle of 45 degrees with respect to the rotation plane in a direction normal to the rotation plane, whereby the intensity of the transmitted light is measured by a photodiode from the opposite side through a polarizer having a transmission axis parallel to the incident polarization plane.

The transmitted light intensity spectrum formed by interference is fitted by simulation to the following theoretical formulae (3) and (4) to obtain a pretilt angle α.

$$T(\phi) = \cos^2\left[\frac{\pi d}{\lambda}\left(\frac{NoNe\sqrt{N^2(\alpha)-\sin\phi}}{N^2(\alpha)} - \sqrt{N^2e - \sin^2\phi} - \frac{N^2e - N^2o}{N^2(\alpha)}\sin\alpha \cdot \cos\alpha \cdot \sin\phi\right)\right] \quad (1)$$

$$N(\alpha) = \sqrt{N^2o\cos^2\alpha + N^2e\sin^2\alpha} \quad (2)$$

In the above formulae, the symbols have the following meanings:

No: refractive index of ordinary ray,
Ne: refractive index of extraordinary ray,
φ: rotation angle of liquid crystal panel,
T(φ): transmitted light intensity,
d: cell thickness, and
λ: wavelength of incident light.

An image display apparatus including a liquid crystal device according to the present invention will now be described.

Figure 8:
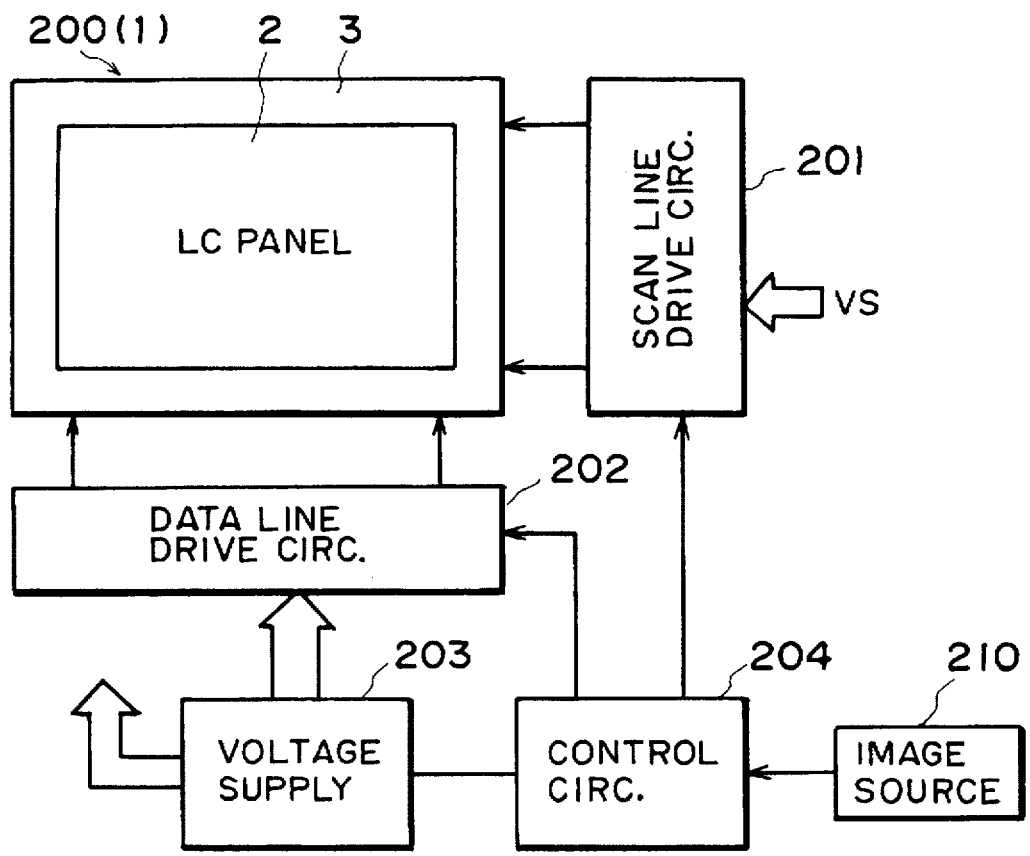
FIG. 8 is a block diagram of an image display apparatus including a liquid crystal device according to the invention.

FIG. 8 is a block diagram of such an image display apparatus, particularly a control system thereof. Referring to FIG. 8, the display apparatus includes a display device 20 which includes a liquid crystal device (panel) 1 including the effective display region 2 and the peripheral region 3 as described above and, additionally, cross nicol polarizers (or one polarizer in the case of a reflection-type display device) and a backlight optionally used. The display apparatus further includes a scanning line drive circuit 201 including a decoder and switches; a data line drive circuit 202 including a latch circuit, a shift register, and switches; a reference voltage-generating circuit 203 for supplying multiple levels of reference voltages to the circuits 201 and 202; a control circuit 204 including a CPU and a RAM for retaining image data; and an image signal supply 210 for supplying input image data, such as an image sensor or a computer for operating an application program.

Figure 9:
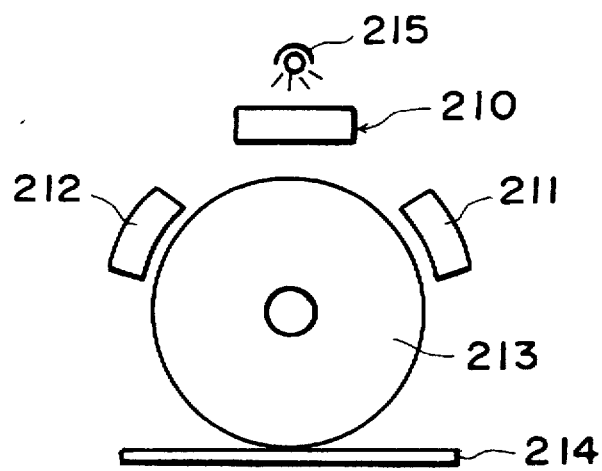
FIG. 9 is a schematic illustration of an image forming apparatus including a liquid crystal device according to the invention.

Next, an image forming apparatus including a liquid crystal device according to the present invention will be described. FIG. 9 is an illustration of such an image forming apparatus. Referring to FIG. 9, the image forming apparatus includes an exposure means 210 for forming an electrostatic image on a photosensitive member 213 which comprises a photoconductor, such as hydrogenated amorphous silicon containing carbon or an organic photoconductor (OPC). The exposure means 210 includes a liquid crystal device as described above in combination with polarizing means as an array or matrix of light valves and is backed with a light source 215. The image forming apparatus further includes a developing means 211 for developing the electrostatic image on the photosensitive member 213 with a developer to form a toner image on the photosensitive member 213. The toner image formed on the photosensitive member is transferred onto a recording medium 214, such as plain paper. The residual toner on the photosensitive member 213 is removed by a cleaning means 212.

Figures 10A, 10B:
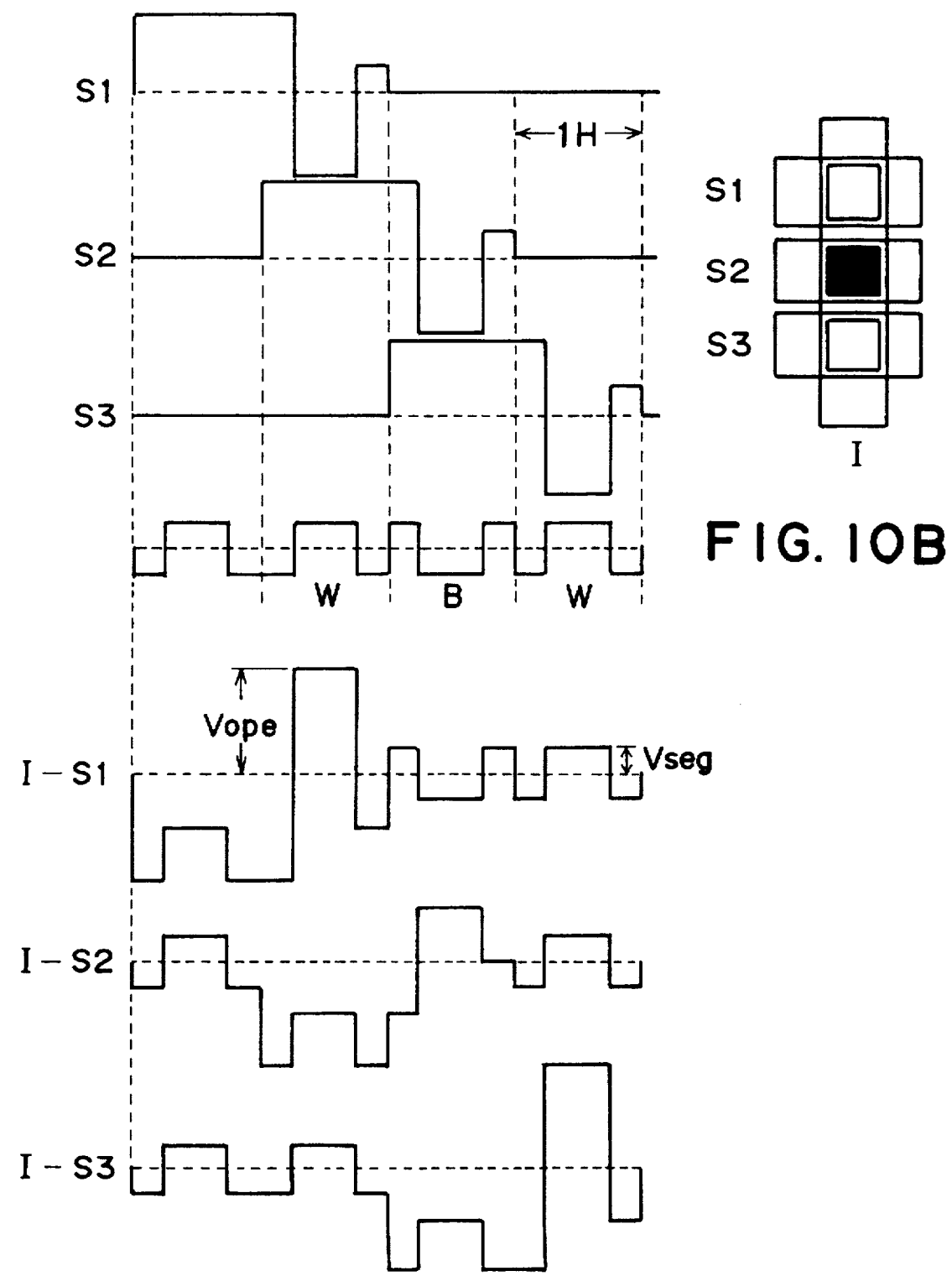
FIG. 10A is a waveform diagram illustrating a set of drive signals for driving a liquid crystal device according to the invention.
FIG. 10B is an illustration of the resultant display state.

A liquid crystal device according to the present invention as described above may be driven by a set of drive signals as representatively shown in FIG. 10A. The drive signals shown in FIG. 10A include scanning signals $S_1$, $S_2$ and $S_3$ supplied from a scanning line drive circuit (201 in FIG. 8) to scanning lines $S_1$, $S_2$ and $S_3$, respectively; a data signal from a data line drive circuit (202 in FIG. 8) to a data line I; and combined voltage waveforms I-$S_1$, I-$S_2$ and I-$S_3$ applied to pixels at intersections of the data line I and the scanning lines $S_1$, $S_2$ and $S_3$, respectively, for providing a display state as shown in FIG. 10B composed of white (W), black (B) and white (W) pixels.

Hereinbelow, some specific embodiments of the liquid crystal device (panel) according to the present invention will be described with reference to drawings.
(First embodiment)

Figure 11:
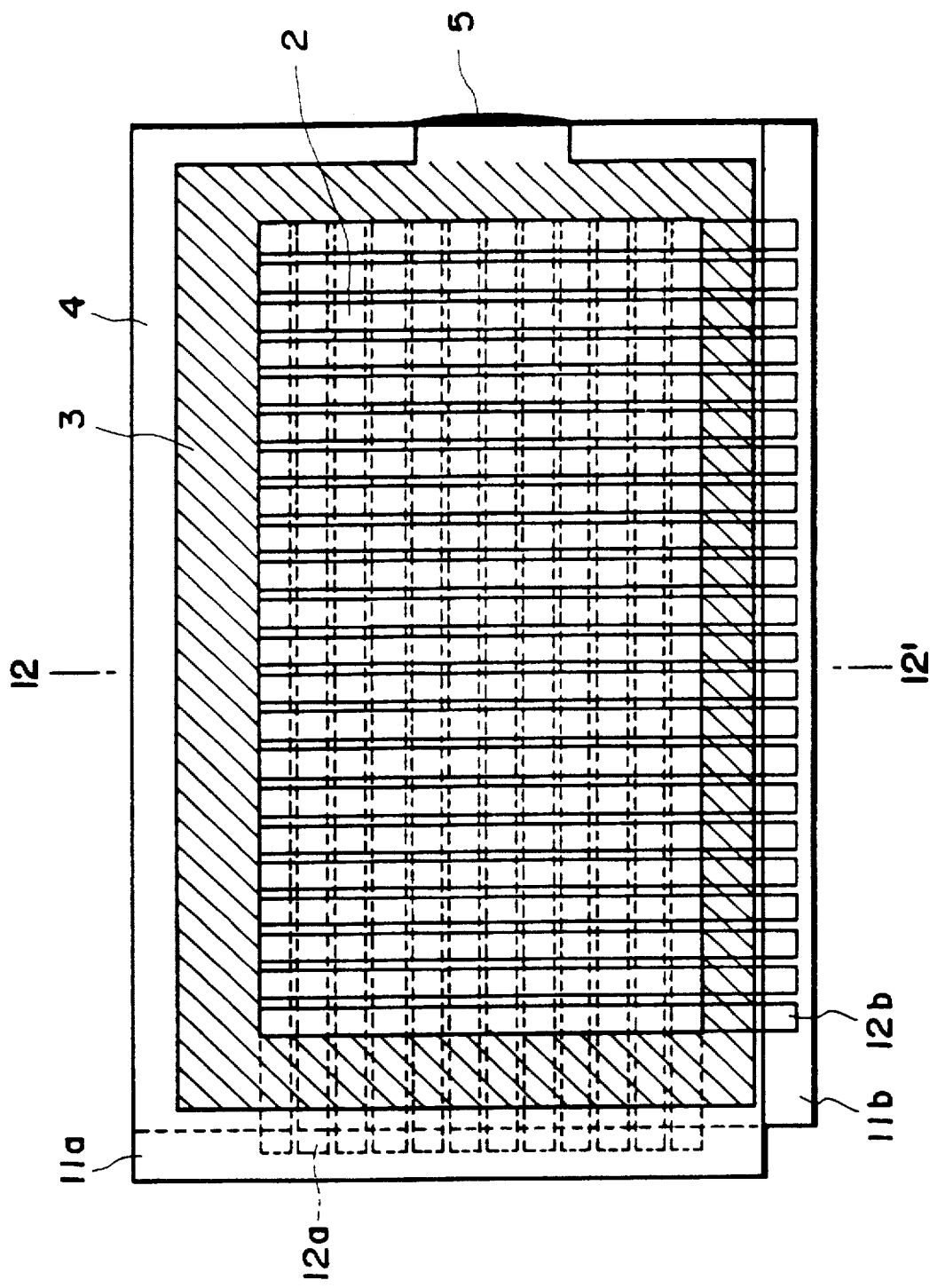
FIGS. 11 and 12 are a schematic plan view and a schematic sectional view, respectively of a first embodiment of the liquid crystal device according to the invention.
Figure 12:
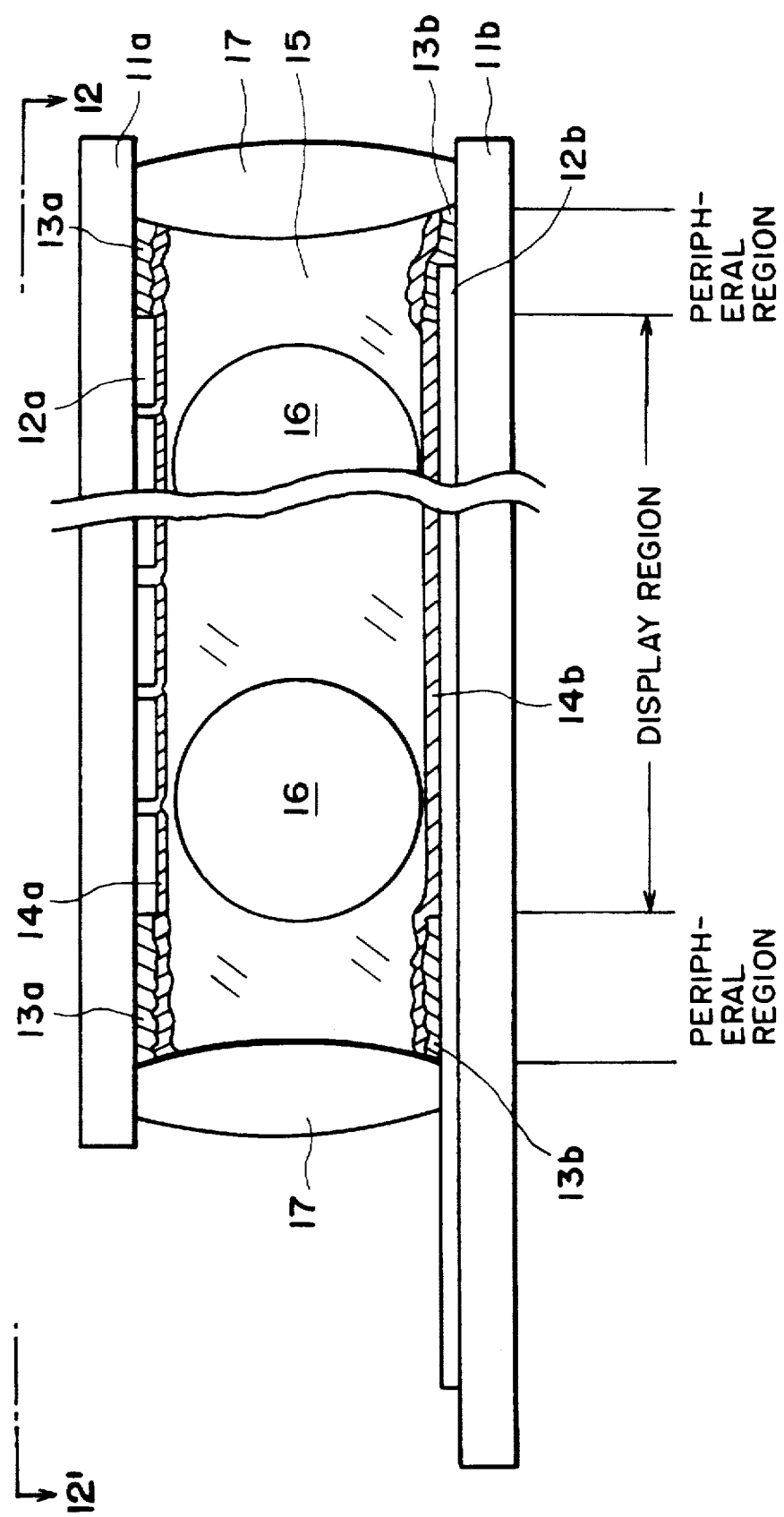

FIG. 11 is a plan view of a liquid crystal panel according to one embodiment of the present invention, and FIG. 12 is a sectional view taken along a line 12-12' in FIG. 11. Referring to these figures, the liquid crystal panel includes a pair of an upper substrate 11a and a lower substrate 11b disposed parallel to each other and respectively having transparent electrodes 12a and 12b thereon each having a thickness of, e.g., about 400–2500 Å. In this embodiment, parts of the substrates 11a and 11b corresponding to a peripheral region 3 are coated with about 100 to 1000 Å-thick insulating films 13a and 13b containing about 100 to 1000 Å-dia. silica beads formed by solution application, for the purpose of providing a larger pretilt angle in the peripheral region 3 than in a display region 2 provided with stripe electrodes 12a and 12b and surrounded by the peripheral region 3 and for establishing a homeotropic alignment in the peripheral region 3. Further, the substrates 11a and 11b in both the display region 2 and peripheral region 3 are coated with alignment films 14a and 14b, between which a ferroelectric liquid crystal 15 is disposed. The alignment films 14a and 14b in the display region 2 have been selectively subjected to an aligning treatment for aligning the ferroelectric liquid crystal 15 in the display region 2. The alignment state of a ferroelectric liquid crystal is affected not only by an aligning treatment condition but also by a surface state below the alignment film. In this embodiment, if the alignment film is subjected to an aligning treatment under the condition of providing a ferroelectric liquid crystal in a uniform alignment as described above in the display region, the ferroelectric liquid crystal in the peripheral region is aligned with a higher pretilt angle or aligned homeotropically. This has been confirmed by our experiments. The realization of such an alignment state in the peripheral region may also be performed by another method.

It is possible to dispose an insulating film (of e.g., $SiO_2$, $TiO_2$ or $Ta_2O_5$) in a thickness of, e.g., 200–3000 Å between the transparent electrode 12a (and/or 12b) and the alignment film 14 (and/or 14b). The spacing between the substrates 11a and 11b may be controlled by silica beads 16 having an average diameter of about 1.5 μm dispersed within the liquid crystal layer 15, and the substrates 11a and 11b are bonded to each other with a sealing adhesive 17 (4).
(Second embodiment)

Figure 13:
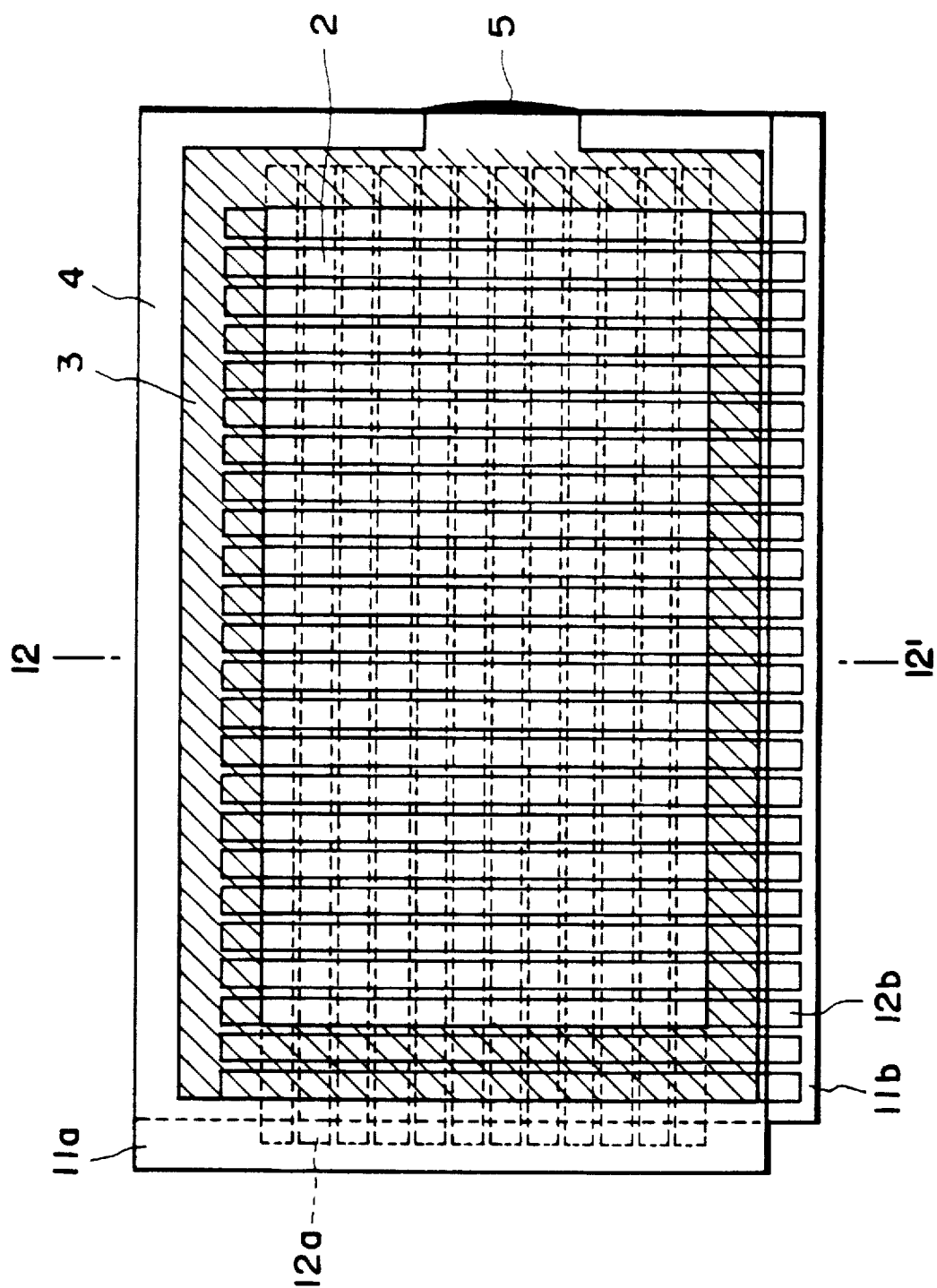
FIGS. 13–15 are schematic plan views of second to fourth embodiments, respectively, of the liquid crystal device according to the invention.

FIG. 13 shows a second embodiment which is a modification of the above-mentioned first embodiment. In this embodiment, the electrodes 12a supplied with scanning signals and the electrodes 12b supplied with data signals are respectively extended to the left and right peripheral regions and the upper and lower peripheral regions. Accordingly, all the four sides of peripheral regions can be supplied with bipolar pulses for driving.

As a result, according to this embodiment, the liquid crystal in the peripheral region is freed from an inclination of assuming one stable state, and the liquid crystal molecular movement thereat is made smooth to provide a further enhanced effect of preventing the yellowing.
(Third embodiment)

Figure 14:
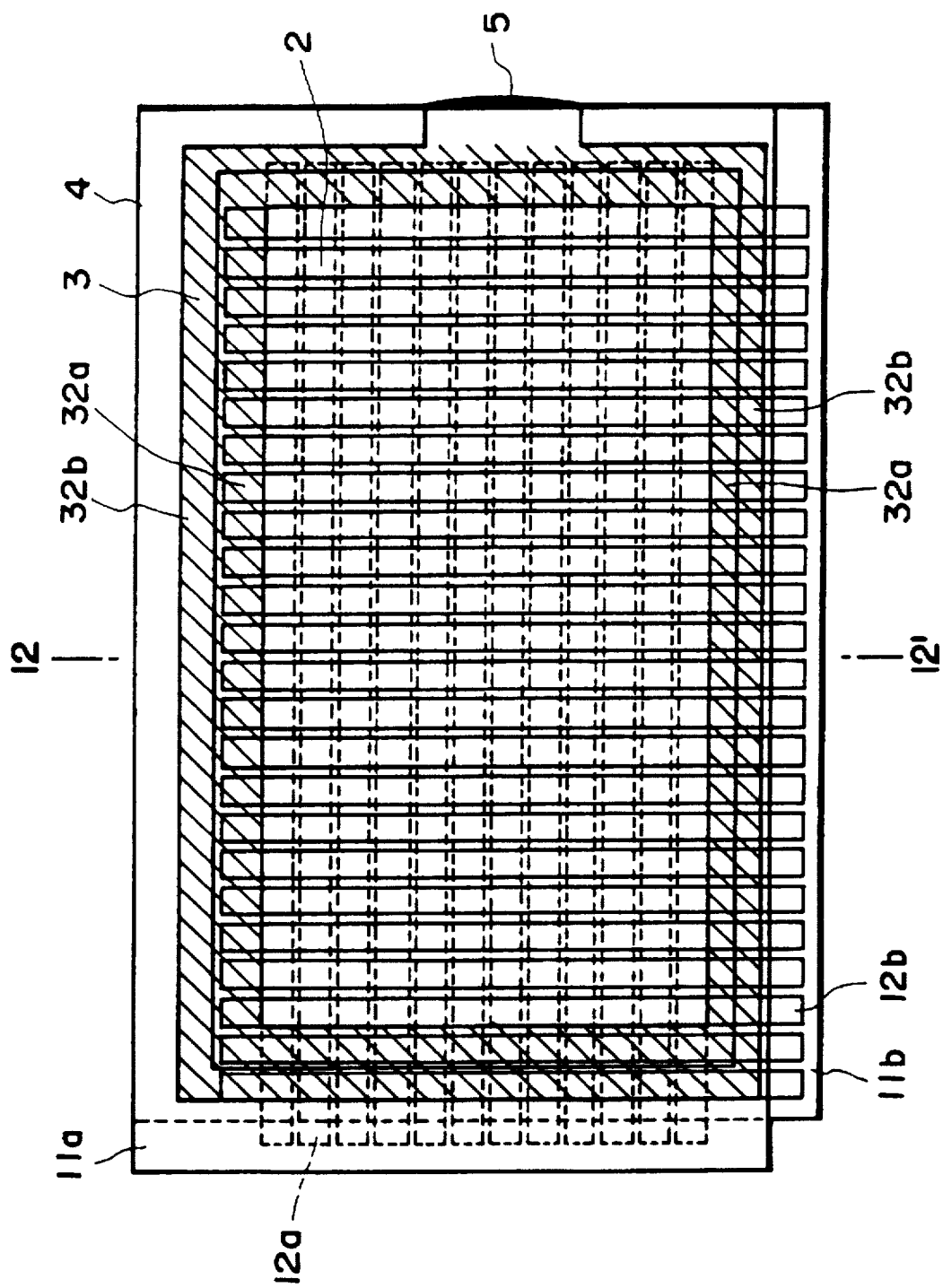

FIG. 14 shows a third embodiment which is a further modification of the second embodiment. In this embodiment, the peripheral region 3 is separated into an inner frame region 32a adjacent to the display region 2 and an outer frame region 32b surrounding the inner frame region 32a. Herein, the substrates 11a and 11b in the inner frame region 32a are subjected an aligning treatment identical to that applied in the display region 2, so that the resultant pretilt angle is identical to that in the display region. On the other hand, the substrates 11a and 11b in the outer frame region 32b are subjected to a high-pretilt treatment so that the liquid crystal in the outer frame region 32b is caused to have a high pretilt angle of at least 20 degrees.

In this embodiment, the inner and outer frame regions 32a and 32b are optically masked so that the optical change caused by the liquid crystal in these regions is made unnoticeable.

The masking may be performed by disposing a light-interrupting (i.e., optically masking) film on at least one of the substrates 11a and 11b at the corresponding parts or by disposing the peripheral regions at a part masked by a housing to which the display panel is affixed.

(Fourth embodiment)

Figure 15:
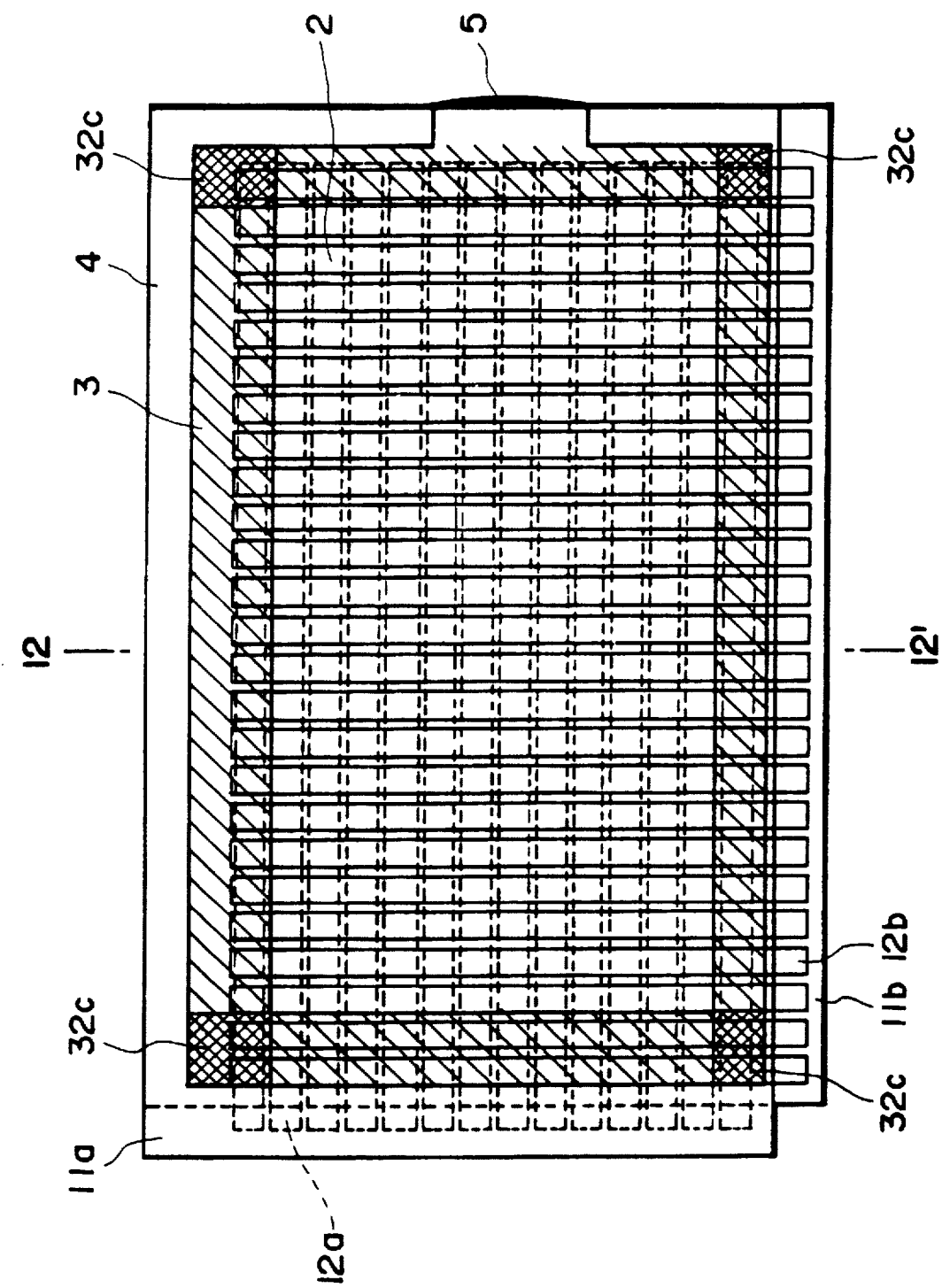

FIG. 15 shows a fourth embodiment which is a modification of the second embodiment. In this embodiment, there are formed masked pixels each at an intersection of a scanning electrode 12a and a data electrode 12b in the peripheral region next to all four sides of the display region. Further, four corners 32c are filled with a sealing adhesive so that the peripheral region is divided into four (upper, lower, left and right) separate peripheral regions including the masked pixels.

In this embodiment, all the electrodes including those constituting the masked pixels are supplied with bipolar pulses having positive and negative voltages with respect to a certain reference potential (e.g., a potential allotted to a non-selected scanning electrode).

As described above, the peripheral region need not be disposed so as to surround all four sides of the display region, and the prevention of yellowing may be accomplished if the peripheral region is formed to have a width of at least one pixel in the display region. However, in consideration of repetitively forming a specific display pattern, such as a stripe pattern, or an all-black or all-white display state, for a long period by a refresh drive, it is desirable to form the peripheral region so as to surround the entire periphery of the display region as shown in FIGS. 11 to 14. In order to prevent the difficulty accompanying a possible discontinuity in alignment at the boundary between the low-pretilt alignment region and the high-pretilt alignment region coinciding with the edge of the display region and an ill effect influencing the display quality in the display region, it is preferred to dispose an inner frame region of a low pretilt angle as in the embodiment of FIG. 14. In this instance, it is proper to provide the inner frame region with an width of at least one pixel similarly as the outer frame region. The masked pixels formed in the embodiment of FIG. 15 may be formed as a low-pretilt region similarly as in the display region.

Hereinbelow, some performances of the liquid crystal device according to the present invention will be described based on experimental examples.

EXAMPLE 1

Two glass substrates each in a planar size of 300 mm×320 mm and a thickness of 1.1 mm were respectively coated by sputtering with a ca. 1500 Å-thick ITO (indium tin oxide) film, which was then patterned into stripe electrodes through lithographic steps.

The stripe electrodes were further coated with a ca. 900 Å-thick $Ta_2O_5$ film for short circuit prevention formed by sputtering. Then, as shown in FIG. 13, on a display region 2 and a peripheral region 3 surrounding the display region 2 of each substrate, an insulating film-precursor solution containing about 450 Å silica beads ("PAM 606EP" mfd. by Shokubai Kasei K.K.) was applied by flexography and baked at 300° C. for ca. 1 hour to form a ca. 200 Å-thick uneven insulating film. Then, on the entire surface including the display region and the peripheral region of each substrate, a polyimide-precursor solution ("LQ1800", mfd. by Hitachi Kasei K.K.) was applied by flexography and then baked at ca. 270° C. for ca. 1 hour for imidation to form a ca. 200 Å-thick polyimide alignment film, which was then subjected to a rubbing treatment with a nylon pile yarn-planted rubbing cloth except for the peripheral region. Then, on one of the two substrates treated in the above-described manner, ca. 1.5 μm-dia. silica beads were dispersed, and the other substrate on the periphery of which a sealing adhesive had been applied by flexography except for leaving an injection port 5 was applied, so that the rubbing directions on the substrates were substantially parallel to each other and in identical directions. (As a matter in general, the rubbing directions can be disposed to intersect each other). Thus, a blank panel having a display region with a diagonal size of ca. 15 inches was prepared. The panel at this stage still retained an injection port 5, through which a liquid crystal should be injected.

For the liquid crystal injection, the blank panel was placed in an injection vessel, the interior of which could be heated and compressed. Then, the injection vessel was evacuated to form a vacuum within the blank panel, and a liquid crystal was applied onto the injection port of the panel.

Then, the temperature within the injection vessel was raised to lower the viscosity of the liquid crystal and the pressure within the vessel was increased, thereby to inject the applied liquid crystal into the panel through the injection port. After completion of the liquid crystal injection, the panel was cooled to an SmC* phase temperature and then the injection port was plugged with an epoxy resin adhesive to prepare a liquid crystal panel of this Example. The liquid crystal used was a pyrimidine-based mixture ferroelectric liquid crystal showing the following phase transition series.

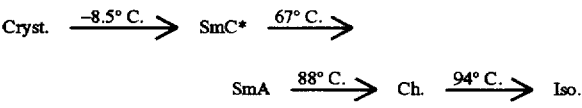

Separately, in order to evaluate the pretilt angles in the display region and the peripheral region of the above-prepared liquid crystal panel, two types of test liquid crystal panels were prepared in from two pairs of substrates. Each pair of the substrates had the same surface laminar structure as the pair of substrates having provided the above-prepared panel of this Example. Further, one pair of the substrates were rubbed respectively in one direction in the same manner as above but were applied to each with a spacing of 20 μm so that their rubbing directions were parallel and opposite to each other, followed by filling with a liquid crystal shown below, to provide a test panel for measuring a pretilt angle corresponding to the display region of the panel of this Example. The other pair of substrates were not rubbed in one direction and were applied with a spacing of 20 μm, followed by filling with the liquid crystal shown below, to provide a test panel for measuring a pretilt angle corresponding to the peripheral region of the panel of Example.

The liquid crystal used was a liquid crystal mixture assuming SmA phase in the temperature range of 10°–55° C.

obtained by mixing 80 wt. % of a ferroelectric liquid crystal ("CS-1014", mfd. by Chisso K.K.) with 20 wt. % of a compound represented by the following formula:

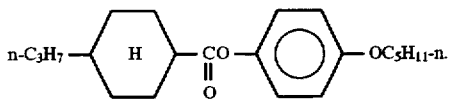

The pretilt angles measured in the above-described manner were 17.5 degrees corresponding to the display region and 58.5 degrees corresponding to the peripheral region. In the actual liquid crystal panel of this Example, a uniform alignment state was formed in the display region, and an alignment state providing substantially no bright state under cross nicol polarizers was formed in the peripheral region.

Figure 16:
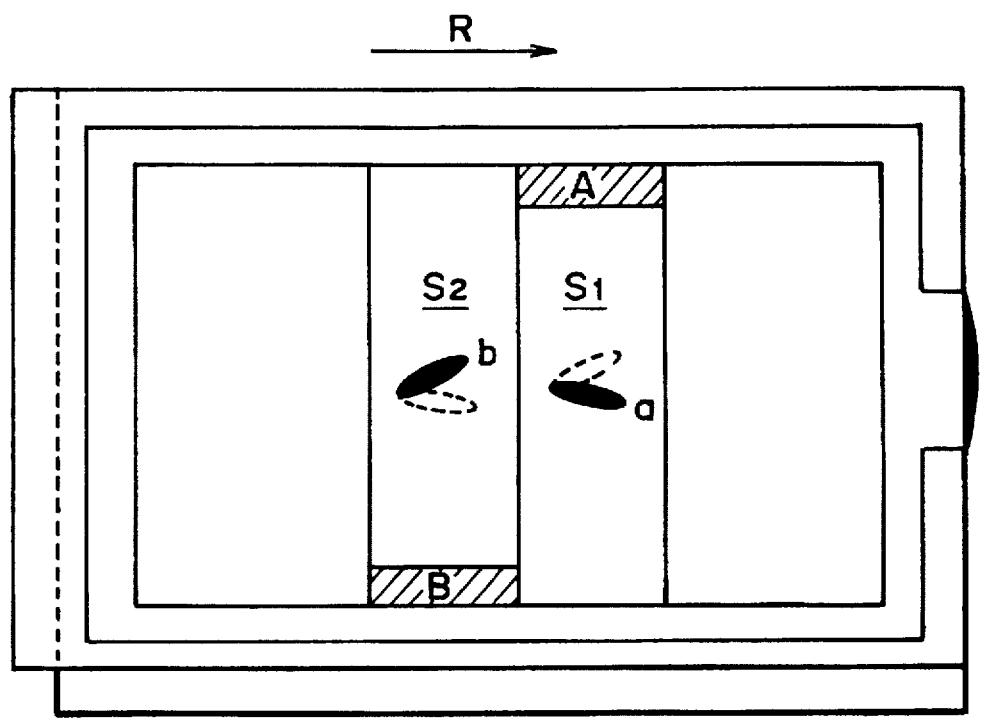
FIG. 16 is a schematic plan view for illustrating a manner of evaluating liquid crystal molecular movement.

Then, in order to evaluate the degree of liquid crystal molecular movement in the liquid crystal panel, two stripe areas $S_1$ and $S_2$ were formed so as to extend perpendicularly to the rubbing direction R of the panel as shown in FIG. 16. In the stripe area $S_1$, liquid crystal molecules were uniformly oriented to one stable state assuming an average molecular axis a and, in the stripe area $S_2$, liquid crystal molecules were uniformly oriented to the other stable state assuming an average molecular axis b. In this state, the panel was continually supplied with ½ duty rectangular AC pulses of 25 μsec in pulse width and 40 volts in voltage amplitude for ca. 20 hours. Thereafter, the cell thickness was measured at two points A and B, i.e., two points on opposite sides in the display region. As a result, no cell thickness change was observed at all compared with the cell thickness before the above electric field application.

COMPARATIVE EXAMPLE

A liquid crystal panel was prepared in the same manner as in Example 1 except that the peripheral region was not provided with the uneven insulating film containing silica beads but was rubbed similarly as in the display region. As a result of measurements in the same manner as in Example 1, the pretilt angle was 17.6 degrees at the display region and 17.3 degrees in the peripheral region. The alignment state in both regions was a uniform alignment.

Then, the liquid crystal molecular movement was evaluated in the same manner as in Example 1, parts A and B showed cell thickness increases of 35% and 39%, respectively, compared with the values before the electric field application.

EXAMPLE 2

In this example, a liquid crystal panel was prepared by using a homeotropic aligning agent for providing a homeotropic alignment state in the peripheral region. More specifically two substrates were treated in the same manner as in Example 1 up to the provision of the $Ta_2O_5$ film. Then, each substrate was coated with a polyimide alignment film identical to the one formed in Example 1. Then, two substrates were subjected to a rubbing treatment, application to each other and liquid crystal injection in a similar manner as in Example 1 to prepare a liquid crystal panel.

In the panel, a uniform alignment was formed in the display region and a substantially homeotropic alignment was formed in the peripheral region.

Then, the liquid crystal molecular movement was evaluated in the same manner as in Example 1, whereby no cell thickness change was observed at either point A or point B compared with the state before the electric field application.

EXAMPLE 4

A liquid crystal panel having a planar pattern as shown in FIG. 13 and including a smectic liquid crystal aligned in a bookshelf structure as shown in FIG. 6A was prepared in a similar manner as in Example 1 except that the solution-application type insulating film was formed without including the 450 Å-dia. silica beads, a fluorine-containing ferroelectric liquid crystal was used, and the substrates were applied to each other so that their rubbing directions were parallel and opposite to each other.

The pretilt angle in the display region was 2–3 degrees and the pretilt angle in the peripheral region was 58.5 degrees.

The yellowing or the cell thickness change was not at all observed similarly as or even less than in Example 1 while the inner surfaces of the substrates in the peripheral region were not roughened.

As a result of several experiments performed while varying the rubbing intensity, excellent performances were attained by panels showing a pretilt angle not exceeding 5 degrees.

EXAMPLE 5

Example 1 was repeated while varying the alignment film material and the rubbing intensities to prepare several liquid crystal panels having a chevron structure of C1 uniform alignment and various pretilt angles in the display region.

In this case, good yellowing-preventing effect was exhibited by liquid crystal panels showing a pretilt angle in the display region of 10 degrees or higher, particularly 15–25 degrees, in combination with the roughened inner surface provided by inclusion of silica beads in the display region.

EXAMPLE 6

In a similar manner as in Example 1, a liquid crystal panel having a peripheral region including an inner frame region 32a subjected to rubbing and an outer frame region 32b not subjected to rubbing as shown in FIG. 14 was prepared.

The pretilt angle was 17 degrees in the inner frame region.

The panel was evaluated with respect to the liquid crystal molecular movement in the same manner as in Example 1 with the proviso that the electrodes constituting the inner frame region was supplied with the same signals as in the display region.

As a result, the cell thickness change or yellowing was not observed even after continuation of the electric field application over 60 hours.

EXAMPLE 7

Sample liquid crystal panels respectively having the following characteristics were prepared by appropriately modifying Example 1.

[Reference sample]

A panel having a planar pattern as shown in FIG. 11, having a pretilt angle of 18 degrees in both display region and peripheral region, and having roughened inner surfaces.

[Sample A]

A panel having a planar pattern as shown in FIG. 11 and not provided with the insulating films for surface roughening.

[Samples B1 and B2]

Panels having a planar pattern as shown in FIG. 11 including a liquid crystal in chevron structure having pretilt angles of 18 degrees (B1) and 8 degrees (B2), respectively, in the display region.

[Samples C1 and C2]

Panels having a planar pattern as shown in FIG. 11 including a liquid crystal in bookshelf structure having pretilt angles of 2 degrees (C1) and 6 degrees (C2), respectively, in the display region.

[Sample D]

A panel having a planar pattern as shown in FIG. 11 and a roughened inner surface.

[Sample E]

A panel having a planar pattern as shown in FIG. 11 and including adhesive beads dispersed in addition to the spacer beads in the display region and the peripheral region.

[Sample F]

A panel having a planar pattern as shown in FIG. 14 prepared without roughening of inner surfaces.

[Samples G1 and G2]

Panels having a planar pattern as shown in FIG. 14 including a liquid crystal in chevron structure having pretilt angles of 18 degrees (G1) and 8 degrees (G2), respectively, in the display region.

[Samples H1 and H2]

Panels having a planar pattern as shown in FIG. 14 including a liquid crystal in bookshelf structure having pretilt angles of 2 degrees (H1) and 6 degrees (H2), respectively, in the display region.

[Sample I]

A panel having a planar pattern as shown in FIG. 14 and a roughened inner surface.

[Sample J]

A panel having a planar pattern as shown in FIG. 14 and including adhesive beads dispersed in addition to the spacer beads in the display region and the peripheral region.

[Sample K]

A panel having a planar pattern as shown in FIG. 14, having roughened inner surfaces, including a liquid crystal in a chevron structure with a pretilt angle of 18 degrees and including adhesive beads.

[Sample L]

A panel having a planar pattern as shown in FIG. 15 prepared without roughening of inner surfaces.

10 panels were prepared for each sample and evaluated with respect to the items of (1) yellowing after continuation of electric field application for 20 hours, 40 hours and 60 hours, respectively, after the occurrence of yellowing for all 10 panels of the reference sample panel; (2) alignment as evaluated by occurrence of alignment defects at the sides of the display region; and (3) monostability as evaluated by a difference in threshold between two directions of switching between two stable states.

The results are summarized in the following Table wherein ◎ represents that 6 or more panels showed a better performance, ○ represents that 2–5 panels showed a better performance, and △ represents that 0–1 panel showed a better performance, respectively compared with the reference sample panel.

| Sample | Yellowing after 20 hrs. | Yellowing after 40 hrs. | Yellowing after 60 hrs. | Alignment | Monostability |
|---|---|---|---|---|---|
| A  | ◎ | ○ | △ | ○ | △ |
| B1 | ◎ | ◎ | ○ | △ | ○ |
| B2 | ◎ | ○ | ○ | △ | △ |
| C1 | ◎ | ◎ | ◎ | ○ | △ |
| C2 | ◎ | ○ | ○ | △ | △ |
| D  | ◎ | ○ | ○ | △ | △ |
| E  | ◎ | ◎ | ○ | △ | △ |
| F  | ◎ | ○ | △ | ◎ | △ |
| G1 | ◎ | ◎ | ○ | ◎ | ○ |
| G2 | ◎ | ○ | ○ | ◎ | △ |
| H1 | ◎ | ◎ | ◎ | ◎ | △ |
| H2 | ◎ | ○ | ○ | ◎ | △ |
| I  | ◎ | ○ | ○ | ◎ | △ |
| J  | ◎ | ◎ | ○ | ◎ | △ |
| K  | ◎ | ◎ | ◎ | ◎ | ○ |
| L  | ○ | △ | △ | △ | △ |

As described above, according to the present invention, the pretilt angle in a peripheral region surrounding a display region is made larger than that in the display region or the liquid crystal in the peripheral region is placed in a homeotropic alignment state to prevent or suppress the occurrence of a local pressure difference along a liquid crystal device (panel) caused under continual application of an electric field, thereby preventing the occurrence of a cell thickness change or yellowing accompanying the cell thickness change.

What is claimed is:

1. A liquid crystal device comprising a pair of oppositely disposed substrates having opposing inner surfaces and opposing electrodes thereon, and a chiral smectic liquid crystal disposed between the opposing electrodes, said liquid crystal device having an effective optical modulation region and a peripheral region outside the effective optical modulation region;

wherein liquid crystal molecules in the peripheral region have a pretilt angle which is larger than a pretilt angle of liquid crystal molecules in the effective optical modulation region; and the liquid crystal molecules in the effective optical modulation region have a pretilt angle of at most 5 degrees.

2. A liquid crystal device according to claim 1, wherein said chiral smectic liquid crystal comprise liquid crystal molecules susceptible of movement along the inner surfaces of the substrates under application of an electric field.

3. A liquid crystal device according to claim 1, wherein the inner surface of at least one of the substrates is roughened.

4. A liquid crystal device according to claim 1, wherein a plurality of adhesive particles and a plurality of spacers are disposed between the substrates.

5. A liquid crystal device according to claim 1, wherein the opposing electrodes are supplied with a drive signal comprising bipolar pulses, with respect to a reference potential, for driving.

6. A liquid crystal device according to claim 1, wherein the peripheral region is optically covered with a masking member.

7. A liquid crystal device according to claim 1, wherein said chiral smectic liquid crystal is a ferroelectric liquid crystal.

8. An image forming apparatus, comprising an exposure means including a liquid crystal device according to claim 1, a photosensitive means to be exposed by the exposure means, a developing means and a transfer means.

9. An image forming apparatus, comprising a display means including a liquid crystal device according to claim 1, a drive means for supplying drive signals to the display means, and at least one polarizer.

10. An image forming apparatus, comprising a display means including a liquid crystal device according to claim 1, a drive means for supplying drive signals to the display means, and at least one polarizer and an image source for supplying image signals to be displayed.

11. An image display apparatus according to claim 1, wherein said image source comprises an image sensor.

12. An image display apparatus according to claim 1, wherein said image source comprises a computer.

13. A liquid crystal device according to claim 1, wherein the liquid crystal is homeotropically aligned in the peripheral region, and is aligned to form a bookshelf structure in the effective optical modulation region.

14. A liquid crystal device according to claim 13, wherein the inner surface of one substrate is coated with an alignment film which has been rubbed in the effective optical modulation region and not rubbed in the peripheral region.

15. A liquid crystal device according to claim 13, wherein said chiral smectic liquid crystal is a fluorine-containing ferroelectric liquid crystal.

* * * * *

UNITED STATES PATENT AND TRADEMARK OFFICE
CERTIFICATE OF CORRECTION

PATENT NO. : 5,786,879

DATED : July 28, 1998

INVENTOR(S) : YASUTO KODERA ET AL.

It is certified that error appears in the above-identified patent and that said Letters Patent is hereby corrected as shown below:

<u>SHEET 4</u>

Figure 4, "BUBBING" should read --RUBBING--.

<u>COLUMN 1</u>

Line 61, "been always" should read --always been--.

<u>COLUMN 2</u>

Line 4, "be still" should read --still be--.

<u>COLUMN 3</u>

Line 3, "been also" should read --also been--
   Line 51, "accordingto" should read --according to--.
   Line 56, "respectively" should read --respectively,--.

<u>COLUMN 4</u>

Line 10, "view" should read --seen--.

<u>COLUMN 5</u>

Line 15, "been also" should read --also been--.

UNITED STATES PATENT AND TRADEMARK OFFICE
CERTIFICATE OF CORRECTION

PATENT NO. : 5,786,879

DATED : July 28, 1998

INVENTOR(S) : YASUTO KODERA ET AL.

It is certified that error appears in the above-identified patent and that said Letters Patent is hereby corrected as shown below:

COLUMN 6

Line 48, "effecting" should read --effect--.
    Line 49, "large" should read --larger--.

COLUMN 8

Line 15, "shevron" should read --chevron--.

COLUMN 12

Line 44, "film 14" should read --film 14a--.

COLUMN 13

Line 3, "subjected" should read --subjected to--.
    Line 52, "an" should read --a--.

COLUMN 14

Line 50, "in" should be deleted.

UNITED STATES PATENT AND TRADEMARK OFFICE
CERTIFICATE OF CORRECTION

PATENT NO. : 5,786,879

DATED : July 28, 1998

INVENTOR(S) : YASUTO KODERA ET AL.

It is certified that error appears in the above-identified patent and that said Letters Patent is hereby corrected as shown below:

<u>COLUMN 18</u>

Line 40, "comprise" should read --comprises--.

Signed and Sealed this

Twenty-seventh Day of April, 1999

Attest:

Q. TODD DICKINSON

*Attesting Officer*   *Acting Commissioner of Patents and Trademarks*